United States Patent
Murphree et al.

(10) Patent No.: US 9,920,585 B2
(45) Date of Patent: Mar. 20, 2018

(54) SYNTACTIC FOAM FRAC BALL AND METHODS OF USING SAME

(71) Applicant: Halliburton Energy Services, Inc., Houston, TX (US)

(72) Inventors: Zachary R. Murphree, Dallas, TX (US); Michael L. Fripp, Carrollton, TX (US); Zachary W. Walton, Coppell, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 347 days.

(21) Appl. No.: 14/272,240

(22) Filed: May 7, 2014

(65) Prior Publication Data

US 2014/0345878 A1    Nov. 27, 2014

Related U.S. Application Data

(60) Provisional application No. 61/825,977, filed on May 21, 2013.

(51) Int. Cl.

| E21B 33/16 | (2006.01) |
|---|---|
| E21B 33/00 | (2006.01) |
| C09K 8/70 | (2006.01) |
| E21B 34/14 | (2006.01) |
| C09K 8/518 | (2006.01) |
| C09K 8/94 | (2006.01) |
| E21B 34/00 | (2006.01) |

(52) U.S. Cl.
CPC .............. *E21B 33/00* (2013.01); *C09K 8/518* (2013.01); *C09K 8/703* (2013.01); *C09K 8/94* (2013.01); *E21B 34/14* (2013.01); *C09K 2208/00* (2013.01); *E21B 2034/007* (2013.01)

(58) Field of Classification Search
USPC ........................................................ 166/377
See application file for complete search history.

(56) References Cited

U.S. PATENT DOCUMENTS

| 2,703,316 | A | | 3/1955 | Schneider |
| 2,942,668 | A | * | 6/1960 | Maly ................... E21B 33/1208 |
| | | | | 166/185 |
| 3,912,692 | A | | 10/1975 | Casey et al. |
| 4,102,401 | A | | 7/1978 | Erbstoesser |
| 4,244,425 | A | | 1/1981 | Erbstoesser |
| 4,387,769 | A | | 6/1983 | Erbstoesser et al. |

(Continued)

FOREIGN PATENT DOCUMENTS

| AU | 537342 | 6/1984 |
| AU | 537342 B2 | 6/1984 |
| GB | 2025485 A | 1/1980 |

OTHER PUBLICATIONS

International Search Report and Written Opinion issued in related PCT Application No. PCT/US2014/038228 dated Nov. 26, 2014 (16 pages).
International Preliminary Report on Patentability issued in related PCT Application No. PCT/US2014/038228 dated Dec. 3, 2015 (14 pages).
Filing receipt and specification for provisional application entitled "Syntactic Foam Frac Ball and Methods of Using Same," by Zachary Ryan Murphree, et al., filed May 21, 2013 as U.S. Appl. No. 61/825,977.

(Continued)

*Primary Examiner* — Taras P Bemko
(74) *Attorney, Agent, or Firm* — John W. Wustenberg; Baker Botts L.L.P.

(57) ABSTRACT

A method of servicing a wellbore comprising providing a flowable component comprising syntactic foam, communicating the flowable component into a wellbore, and allowing the flowable component to be removed from the wellbore.

18 Claims, 10 Drawing Sheets

(56) References Cited

U.S. PATENT DOCUMENTS

| | | | |
|---|---|---|---|
| 5,216,050 A | 6/1993 | Sinclair | |
| 5,278,194 A * | 1/1994 | Tickner | B01J 13/12 |
| | | | 106/122 |
| 6,323,307 B1 | 11/2001 | Bigg et al. | |
| 7,093,664 B2 | 8/2006 | Todd et al. | |
| 7,647,964 B2 | 1/2010 | Akbar et al. | |
| 8,327,931 B2 | 12/2012 | Agrawal et al. | |
| 2004/0020643 A1* | 2/2004 | Thomeer | E21B 47/01 |
| | | | 166/250.01 |
| 2005/0109511 A1* | 5/2005 | Spencer | E21B 33/13 |
| | | | 166/302 |
| 2005/0224123 A1 | 10/2005 | Baynham et al. | |
| 2007/0131414 A1 | 6/2007 | Calderoni et al. | |
| 2007/0169935 A1 | 7/2007 | Akbar et al. | |
| 2009/0075845 A1* | 3/2009 | Abad | C09K 8/12 |
| | | | 507/117 |
| 2011/0132621 A1* | 6/2011 | Agrawal | E21B 23/04 |
| | | | 166/376 |
| 2011/0284232 A1* | 11/2011 | Huang | E21B 21/103 |
| | | | 166/317 |
| 2012/0285692 A1* | 11/2012 | Potapenko | E21B 21/003 |
| | | | 166/308.1 |

OTHER PUBLICATIONS

Filing receipt and specification for patent application entitled "Syntactic Foam Frac Ball and Methods of Using Same," by Zachary R. Murphree, et al., filed May 7, 2014 as U.S. Appl. No. 14/272,209.
Foreign communication from a related counterpart application—Invitation to Pay Additional Fees, PCT/US2014/038228, dated Jul. 2, 2014, 4 pages.
"3M™ Glass Bubbles HGS Series," Product Information, Apr. 2009, 4 pages, www.3M.com/microspheres.
3M Worldwide brochure entitled "Density Reducing Additives for Drilling Cements," 2005, 1 page.

* cited by examiner

SYNTACTIC FOAM FRAC BALL AND METHODS OF USING SAME

CROSS-REFERENCE TO RELATED APPLICATION

This application claims priority to U.S. Application No. 61/825,977 to Murphree, et al., filed May 21, 2013 and entitled "Syntactic Foam Frac Ball and Methods of Using Same," which is incorporated herein in its entirety.

This is application is also related to U.S. application Ser. No. 14/272,209 to Murphree, et al., filed concurrently herewith and entitled "Syntactic Foam Frac Ball and Methods of Using Same," which is incorporated herein in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A MICROFICHE APPENDIX

Not applicable.

INCORPORATION-BY-REFERENCE OF MATERIAL SUBMITTED ON A COMPACT DISC

Not applicable.

BACKGROUND

A wide variety of flowable downhole tools may be used within a wellbore in connection with well servicing operations (as well as completion operations and the production of oil and/or gas therefrom). Fracturing (frac) balls, for example, may be introduced into a wellbore to operate another downhole device. In one application, a fracturing ball is introduced into a work string or other tubular flowed via gravity and/or the circulation of wellbore fluids to a seat or other receiving apparatus. The ball engages the seat thereby forming a seal and preventing further fluid flow through the work string or tubular, and hydraulic pressure builds up behind it. This hydraulic pressure may be used to operate the device, e.g. to open a valve or actuate a sliding sleeve in the device. In another application, a frac ball contains a signaling device, such as a transceiver. As the frac ball traverses the wellbore communicates with one or more downhole devices in furtherance of a production or workover operation.

In many instances, it is desirable or necessary to retrieve or otherwise consume the frac ball at some point during or after a given servicing operation is complete. However, retrieval may be difficult or impossible, such as in cases where the frac ball becomes stuck, for example when a frac ball cannot be unseated or when there is insufficient wellbore circulation to produce a frac ball from the well. Stuck fracturing balls can decrease the profitability of a well by, for example, reducing the production rate or requiring expensive remedial operations.

Thus, it would be desirable for frac balls to be more easily removed (e.g., produced) from a wellbore. It would also be desirable to develop frac balls from materials that allow the frac ball to be more easily removed (e.g., produced) from a wellbore and that can also withstand downhole hydrostatic pressures, including those encountered in subsea wellbores.

Another example of flowable downhole tools used in furtherance of well servicing operations are plugs. Conventionally, cementing a casing string within a wellbore is achieved by flowing cement to the bottom of the casing string and upward into the annular space between the casing string and the wellbore walls. In order to preserve the integrity of the cementitious slurry used to cement the casing within the wellbore, "cementing plugs" or "wiper plugs" are used to form a barrier between the cementitious slurry and other servicing fluids, for example, to reduce intermixing or intermingling between the cementitious slurry and any other fluid. In applications where the core of a cementing plug is drilled to facilitate fluid flow therethrough (e.g., after a cementing operation), it may be desirable to clear the drilled parts from the newly created flowpath so that the fluid may flow unobstructed. Thus, it would be desirable to develop cementing plugs that may be easily removed from the wellbore.

SUMMARY

Disclosed herein is a method of servicing a wellbore comprising providing a flowable component comprising syntactic foam, communicating the flowable component into a wellbore, and allowing the flowable component to be removed from the wellbore.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
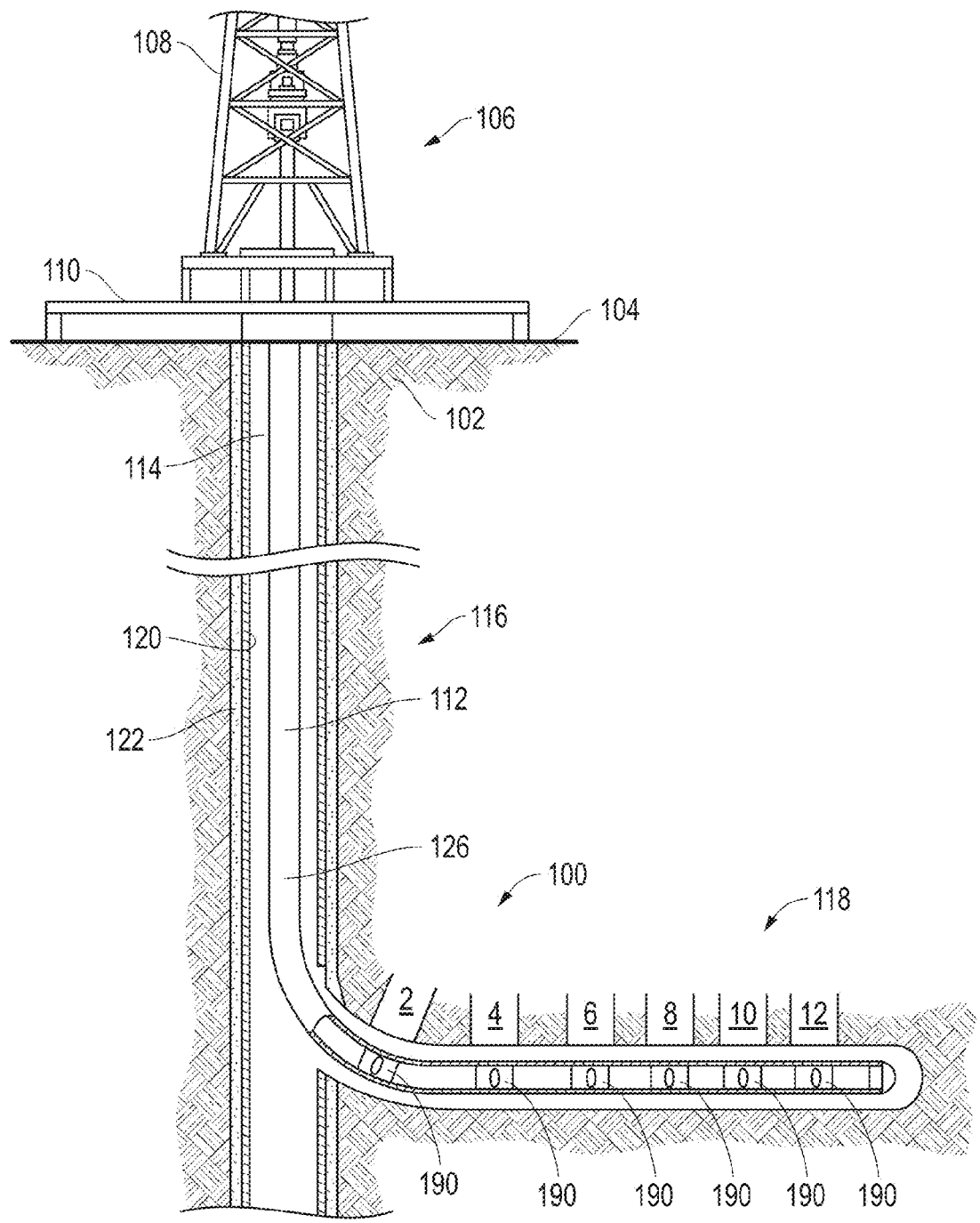
FIG. 1 is a simplified cutaway view of an operating environment wherein the wellbore servicing apparatuses disclosed herein may be employed.

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is not intended to limit the invention to the embodiments illustrated and described herein. It is to be fully recognized that the different teachings of the embodiments discussed herein may be employed separately or in any suitable combination to produce desired results.

In the following discussion and in the claims, the terms "including" and "comprising" are used in an open-ended fashion, and thus should be interpreted to mean "including, but not limited to . . . ." Also, unless otherwise specified, use of the terms "connect," "engage," "couple," "attach," or any other like term describing an interaction between elements is not meant to limit the interaction to direct interaction between the elements and may also include indirect interaction between the elements described. Further, use of the term "and/or" in a list of two or more elements shall be construed herein to be inclusive of all possible combinations of the listed elements, as if the list of elements were instead concluded with the phrase "any plurality thereof, or any combination thereof." For example, used herein the phrase "A and/or B" would mean "A, B, or A and B." As another example, used herein the phrase "A, B, and/or C" would mean "A, B, C, or any combination thereof."

Unless otherwise specified, use of the terms "up," "upper," "upward," "up-hole," "upstream," or other like terms shall be construed as generally from the formation toward the surface or toward the surface of a body of water; likewise, use of "down," "lower," "downward," "downhole," "downstream," or other like terms shall be construed as generally into the formation away from the surface or away from the surface of a body of water, regardless of the wellbore orientation. Use of such terms may generally imply a direction toward or into a wellbore. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

The term "zone" as used herein refers to separate parts of the wellbore designated for treatment or production and may refer to an entire hydrocarbon formation or separate portions of a single formation such as horizontally and/or vertically spaced portions of the same formation. The term "seat" as used herein may be referred to as a ball seat, but it is understood that seat may also refer to any type of catching or stopping device for an obturating member or other member sent through a work string fluid passage that comes to rest against a restriction in the passage. The various characteristics mentioned above, as well as other features and characteristics described in more detail below, will be readily apparent to those skilled in the art with the aid of this disclosure upon reading the following detailed description of the embodiments, and by referring to the accompanying drawings.

The methods, systems, and apparatuses disclosed herein include embodiments wherein a flowable component comprising syntactic foam (FCCSF) is used alone or in combination with one or more downhole tools in connection with the servicing of a wellbore. The FCCSF may be flowed through a wellbore as part of one or more wellbore servicing operations, and, in some embodiments, removed from the wellbore, for example, recovered by flowing the FCCSF to the surface. As will be disclosed herein, reference to removal of the FCCSF from the wellbore generally refers to embodiments in which the FCCSF ceases to exist within the wellbore in the form of an FCCSF. Removal of the FCCSF from the wellbore does not, necessarily, mean that some component of an FCCSF (or a product thereof) does not remain within the wellbore, for example, in a form or configuration other than that of an FCCSF. In some embodiments, the syntactic foam, another material of the FCCSF, or a combination thereof may comprise an oil-soluble component, a water-soluble component, a meltable material, a consumable material, a degradable material, a disintegrable material, or combinations thereof. In some embodiments, the FCCSF may include a coating and/or shell, for example, a protective and/or reinforcing coating and/or shell such as a polymeric coating, a metal shell, or combinations thereof. In some embodiments, the FCCSF may be configured to self-orient while flowing through a wellbore, and may comprise a non-uniform strength profile. In some embodiments, the FCCSF may have a surface profile shaped to seat in a receiving member, for example, so as to provide a fluid-tight seal when engaged with the receiving member. In some embodiments, the FCCSF may be configured (e.g., density, surface characteristics, etc.) to exhibit neutral buoyancy, alternatively, positive buoyancy when submerged in a wellbore servicing fluid under downhole fluid dynamic conditions. In some embodiments, the FCCSF may include a signaling device configured to transmit signals to an external sensor. In some embodiments, the FCCSF may be a frac ball, a dart, or a cementing plug, for example, having a drillable core comprising syntactic foam. In some embodiments, an FCCSF as will be disclosed herein might be used in a wellbore servicing operation, for example, a wellbore completion (e.g., cementing) operation, a stimulation (e.g., fracturing, perforating, acidizing, etc.) operation, an operation involving zonal isolation of a work string (e.g., sealing, plugging, etc), or another wellbore operation as may be appreciated to one or ordinary skill in the art upon viewing this disclosure.

Referring to FIG. 1, an embodiment of an operating environment wherein a FCCSF may be employed is illustrated. It is noted that although some of the figures may exemplify horizontal or vertical wellbores, the principles of the methods, apparatuses, and systems disclosed herein may be similarly applicable to horizontal wellbore configurations, conventional vertical wellbore configurations, and combinations thereof. Therefore, the horizontal or vertical nature of any Figure is not to be construed as limiting the wellbore to any particular configuration.

Referring to the embodiment of FIG. 1, the operating environment generally comprises a wellbore 114 that penetrates a subterranean formation 102 comprising a plurality of formation zones 2, 4, 6, 8, 10, and 12 for the purpose of recovering hydrocarbons, storing hydrocarbons, disposing of carbon dioxide, or the like. The wellbore 114 may be drilled into the subterranean formation 102 using any suitable drilling technique. In an embodiment, a drilling or servicing rig 106 comprises a derrick 108 with a rig floor 110, for example, through which a work string 112 (e.g., a drill string, a tool string, a casing string, a segmented tubing string, a jointed tubing string, or any other suitable conveyance, or combinations thereof) generally defining an axial flowbore 126 may be positioned within or partially within the wellbore 114. In an embodiment, such a work string 112 may comprise two or more concentrically positioned strings of pipe or tubing (e.g., a first work string may be positioned within a second work string). The drilling or servicing rig may be conventional and may comprise a motor driven winch and other associated equipment for lowering the work string into the wellbore 114. Alternatively, a mobile workover rig, a wellbore servicing unit (e.g., coiled tubing units), or the like may be used to lower the work string into the wellbore 114. In such an embodiment, the work string may be utilized in drilling, stimulating, completing, or otherwise servicing the wellbore, or combinations thereof.

The wellbore 114 may extend substantially vertically away from the earth's surface over a vertical wellbore portion, or may deviate at any angle from the earth's surface 104 over a deviated or horizontal wellbore portion. In alternative operating environments, portions or substantially all of the wellbore 114 may be vertical, deviated, horizontal, and/or curved and such wellbore may be cased, uncased, or combinations thereof.

In an embodiment, the wellbore 114 may be at least partially cased with a casing string 120 generally defining an axial flowbore. In an alternative embodiment, a wellbore like wellbore 114 may remain at least partially uncased. The casing string 120 may be secured into position within the wellbore 114 in a conventional manner with cement 122, alternatively, the casing string 120 may be partially cemented within the wellbore, or alternatively, the casing string may be uncemented. For example, in an alternative embodiment, a portion of the wellbore 114 may remain uncemented, but may employ one or more packers (e.g., Swellpackers™, commercially available from Halliburton Energy Services, Inc.) to isolate two or more adjacent portions or zones within the wellbore 114. In an embodiment, a casing string like casing string 120 may be positioned within a portion of the wellbore 114, for example, lowered into the wellbore 114 suspended from the work string. In such an embodiment, the casing string may be suspended from the work string by a liner hanger or the like. Such a liner hanger may comprise any suitable type or configuration of liner hanger, as will be appreciated by one of skill in the art with the aid of this disclosure.

Referring to FIG. 1, a wellbore servicing system 100 is illustrated. In the embodiment of FIG. 1, the wellbore servicing system 100 comprises multiple wellbore servicing tools 190 incorporated within the work string 112 and each positioned proximate and/or substantially adjacent to one of subterranean formation zones (or "pay zones") 2, 4, 6, 8, 10, or 12. Although the embodiment of FIG. 1 illustrates six servicing tools (e.g., each being positioned substantially proximate or adjacent to one of three formation zones), one of skill in the art viewing this disclosure will appreciate that any suitable number of servicing tools may be similarly incorporated within a work string.

Disclosed herein are embodiments of a FCCSF (e.g., a ball, dart, cementing plug, etc.), at least a portion of which is made from syntactic foam. In various embodiments as will be disclosed herein the syntactic foam may be sufficiently strong to withstand hydrostatic pressures encountered in the wellbore environment (including subsea wellbores), may exhibit a density sufficiently low to allow the FCCSF to exhibit neutral buoyancy, alternatively, positive buoyancy in a wellbore fluid, may be fabricated and/or formed into various shapes and/or sizes, may be customized to a particular application (e.g., acid-resistant, dissolvable, etc.), or combinations thereof.

Figure 2:
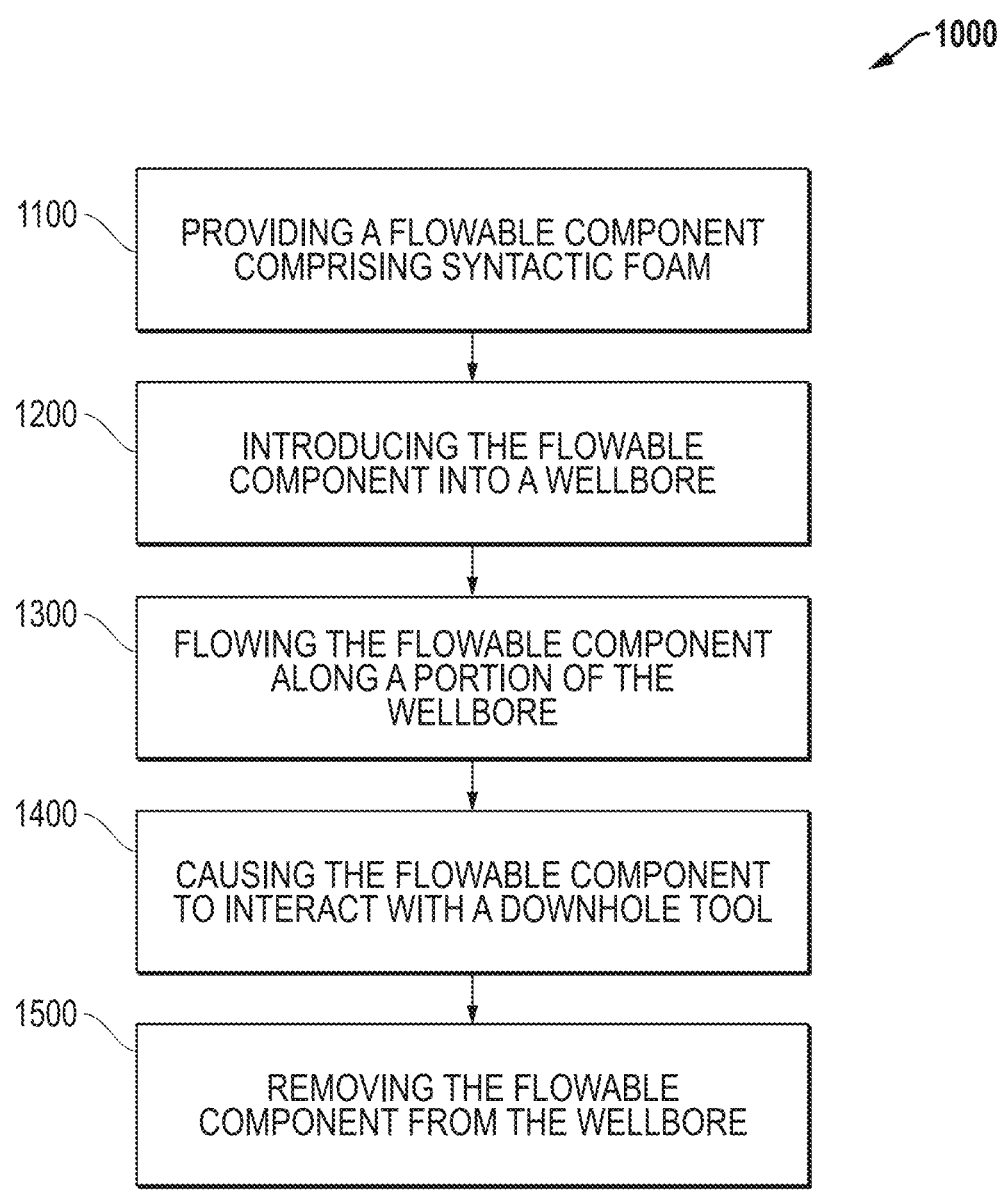
FIG. 2 is a flow chart of a method according to an embodiment of the disclosure.

Also disclosed herein are methods of employing an FCCSF in a wellbore servicing operation. Referring to FIG. 2, an embodiment of a method of servicing a wellbore utilizing a FCCSF is provided. In the embodiment of FIG. 2, the method of servicing a wellbore 1000 generally comprises the steps of providing a FCCSF 1100; introducing the FCCSF into a wellbore 1200; flowing the FCCSF along a portion of the wellbore 1300; causing the FCCSF to interact with a downhole tool 1400; and removing the FCCSF from the wellbore 1500. In various embodiments and as will be disclosed herein, the method of 1000 may be applicable to newly completed wellbores (e.g., use during completion operations such as cementing), previously completed wellbores that have not been previously stimulated or subjected to production (e.g., use during initial perforating and/or fracturing operations), previously completed wellbores that have not been previously stimulated but have been previously subjected to production (e.g., secondary or enhanced production operations), wellbores that have been previously stimulated and previously subjected to production (e.g., workover operations), or combinations thereof.

The method 1000 may begin at block 1100, where in a FCCSF is provided. For example, a FCCSF may be produced or obtained and transported to a wellsite for use in a servicing operation (e.g., placement into a wellbore). As used herein, the term "syntactic foam" refers to a composite material(s) generally comprising hollow particles dispersed within a matrix material. As used herein, a "composite material" refers to a material comprising a heterogeneous combination of two or more components that differ in form and/or composition on a macroscopic scale. While the composite material may exhibit characteristics that neither component possesses alone, the components retain their unique physical and chemical identities within the composite. As used herein, the term "matrix material" refers to any material, whether organic, inorganic, natural, or synthetic, which is capable of providing support to (e.g., binding) the hollow particles of the syntactic foam. For example, the matrix material may comprise a metallic material, a polymeric material, a ceramic material, a plurality thereof, or combinations thereof. As used herein, a "hollow particle" refers to a particle that is hollow or substantially hollow, for example, so as to define and/or substantially define a space or volume (e.g., a void space). In an embodiment, a hollow particle may range from about 0.1 to hundreds of micrometers (i.e., microns) in size. For example, such a hollow particle may be filled with gas or fluid (e.g., a low-density fluid). In such an embodiment, the gas or fluid may be present within the hollow particle at a pressure less than atmospheric pressure, greater than atmospheric pressure, or about atmospheric pressure). In an alternative embodiment, such a hollow particle may define a vacuum. Also, in an embodiment, a hollow particle may be spherical or substantially spherical in shape. Alternatively, a hollow particle may be substantially any suitable shape (e.g., a conical structure, a block or cube-like structure, a polyhedron structure, and/or an irregularly-shaped structure). In an embodiment, the hollow particle may be rigid, alternatively, substantially rigid (e.g., exhibiting the capability to undergo at least some strain prior to failure), alternatively, flexible. Also, it is to be understood that "hollow particle" encompasses all hollow microspheres, hollow microbeads, microballoons, microbubbles, and cenospheres (i.e., hollow spheres primarily comprising silica ($SiO_2$) and alumina ($Al_2O_3$) that are a naturally occurring by-product of the burning process of a coal-fired power).

In an embodiment, the syntactic foams disclosed herein may be characterized as possessing relatively high compressive strengths and densities about equal to or less than the density of water. Although not wishing to be bound by theory, it is believed that the high compressive strengths are largely attributable to the supportive microstructures provided by the matrix materials while the relatively low densities are attributable to the cumulative volume of empty space created by the presence of a plurality of gas-filled hollow particles distributed throughout the matrix material.

In an embodiment, the matrix material may comprise any suitable material. Examples of suitable matrix materials include but are not limited to polymers (e.g., resins), epoxies, rubbers, hardened plastics, phenolic materials, composite materials, metals and metal alloys, cast materials, ceramic materials, or combinations thereof.

In an embodiment, the matrix material may comprise a polymeric material, such as a resin material. The resin material may be used to form a resin matrix wherein the hollow particles of the syntactic foam may be dispersed and supported. Resin materials suitable for use as a resin matrix generally include, but are not limited to, thermosetting resins, thermoplastic resins, solid polymer plastics, and combinations thereof. Suitable thermosetting resins may include, but are not limited to, thermosetting epoxies, bismaleimides, cyanates, unsaturated polyesters, noncellular polyurethanes, orthophthalic polyesters, isophthalic polyesters, phthalic/maelic type polyesters, vinyl esters, phenolics, polyimides, including nadic end-capped polyimides (e.g., PMR-15), and combinations thereof. Suitable thermoplastic resins may include, but are not limited to, polyether ether ketones, polyaryletherketones, polysulfones, polyamides, polycarbonates, polyphenylene oxides, polysulfides, including polyphenylenesulfide (PPS), polyether sulfones, polyamide-imides, polyetherimides, polyimides, polyarylates, poly(lactide), poly(glycolide), liquid crystalline polyester, aromatic and aliphatic nylons, and any combinations thereof.

In an embodiment, the matrix material may comprise a two-component resin material. Suitable two-component resin materials/systems include a hardenable resin and a hardening agent that, when combined, react to form a cured resin matrix material. Suitable hardenable resins include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, and any combinations thereof. Suitable hardening agents that can be used include, but are not limited to, cycloaliphatic amines, aromatic amines, aliphatic amines, imidazole, pyrazole, pyrazine, pyrimidine, pyridazine, 1H-indazole, purine, phthalazine, naphthyridine, quinoxaline, quinazoline, phenazine, imidazolidine, cinnoline, imidazoline, 1,3,5-triazine, thiazole, pteridine, indazole, amines, polyamines, amides, polyamides, 2-ethyl-4-methyl imidazole, and combinations thereof. In an embodiment, one or more additional components may be added to the matrix material to affect the properties of the matrix material.

In various embodiments, the matrix material comprises a metallic material, for example, a metal, an alloy, or an intermetallic compound. Examples of suitable metal materials include, but are not limited to, aluminum, magnesium, nickel, aluminum alloys, magnesium alloys, titanium alloys, nickel alloys, steel, titanium aluminide, nickel aluminide, the like, and combinations thereof. In a particular embodiment, the matrix material of the FCCSF syntactic foam comprises aluminum, an aluminum alloy, or a combination thereof. Examples of suitable aluminum alloy and magnesium alloy matrix materials include, but are not limited to, $AlCu_4$, $AlSil_2$, $AlSi_7$, $AlMg_4$ and AlMg, SiCu, and RR58. In another embodiment, the matrix material comprises magnesium, a magnesium alloy, or a combination thereof. A non-limiting example of a suitable magnesium alloy includes RZ5. In an embodiment, the matrix material of the FCCSF syntactic foam comprises titanium, a titanium alloy, or a combination thereof. Examples of titanium alloys suitable for use as metal matrix materials include, but are not limited to, Ti64, Ti6242, Ti6246 and Ti679. In an embodiment, the matrix material comprises steel, a steel alloy, or a combination thereof. An example embodiment of a suitable steel includes Jethete. In an embodiment, the matrix material comprises nickel, a nickel alloy, or a combination thereof. An example of a suitable nickel alloy includes Inco 718.

In various embodiments, the matrix material may be formed from a composite material. For example, in an embodiment the matrix material may comprise a composite resin material. In an embodiment, the composite resin material may comprise an epoxy resin. In further embodiments, the composite resin material may comprise at least one ceramic material. For example, the composite material may comprise a ceramic based resin including, but not limited to, those materials disclosed in U.S. Patent Application Publication Nos. US 2005/0224123 A1, entitled "Integral Centraliser" and published on Oct. 13, 2005, and US 2007/0131414 A1, entitled "Method for Making Centralizers for Centralising a Tight Fitting Casing in a Borehole" and published on Jun. 14, 2007. For example, in some embodiments, the resin material may include bonding agents such as an adhesive or other curable component. In some embodiments, components to be mixed with the resin material may include a hardener, an accelerator, a curing initiator, or combinations thereof. Further, in some embodiments, a ceramic based resin composite material may comprise a catalyst, for example, to initiate curing of the ceramic based resin composite material. The catalyst may be thermally activated. Alternatively, the mixed materials of the composite material may be chemically activated by a curing initiator. More specifically, in some embodiments, the composite material may comprise a curable resin and ceramic particulate filler materials, optionally including chopped carbon fiber materials. In some embodiments, a compound of resins may be characterized as exhibiting a relatively high mechanical resistance, a relatively high degree of surface adhesion, and/or resistance to abrasion by friction.

In an embodiment, the matrix material may be selected so as to exhibit one or more chemical resistances. For example, it may be desirable to select the material resistant to an acidic wellbore environment. In various embodiments for it, for example, the syntactic foam may comprise a matrix material resistant to one or more acids including, but not limited to, hydrochloric acid, acetic acid, formic acid, hydrochloric acid, and combinations thereof. In an embodiment, the syntactic foam comprises one or more materials resistant to a combination of acetic acid and formic acid. In another embodiment, the syntactic foam comprises one or more materials resistant to hydrofluoric acid and/or hydrochloric acid. In an embodiment, the matrix material may comprise a material resistant to dissolution in and/or chemical attack by crude oil. Examples of materials resistant to oleaginous fluids (such as crude oil) include, but are not limited to, phenolic polymer resins, GPS-based phenolic resins, and combinations thereof. Additional examples of materials resistant to oleaginous fluids and/or having acid-resistance may be found, for example, in the description of matrix materials described above and in the working examples provided below.

A wide variety of hollow particles may be suitable for use in the syntactic foams disclosed herein. The hollow particles may be formed from the same material as the matrix material, a different material, or a combination of similar and dissimilar materials. In various embodiments, the hollow particles may comprise glass, carbon, polystyrene, phenolic resins, and combinations thereof. However, other materials may also be suitable depending on the application.

In an embodiment, the hollow particles may have an average diameter in the range of from about 0.001 micron (μm) to about 1,000 μm, alternatively from about 5 μm to about 500 μm, alternatively from about 10 μm to about 325 μm, alternatively from about 5 μm to about 200 μm. In an embodiment, the hollow particles may have a nominal density in a range of from about 0.20 g/cc to about 0.80 g/cc, alternatively in a range of from about 0.40 g/cc to about 0.60 g/cc.

In an embodiment, the hollow particles may encapsulate one or more gases. For example, in an embodiment, the hollow particles encapsulate air, one or more inert gases, or combinations thereof. Suitable inert gases include, but are not limited to, nitrogen, argon, and the like. Alternatively, in an embodiment, the hollow particles may encapsulate one or more fluid. In an embodiment, the gas and/or fluid within the hollow particles may be present at a pressure that is substantially less than atmosphere pressure, substantially equal to atmospheric pressure, or substantially more than atmospheric pressure. Alternatively, in an embodiment, hollow particles may generally define a void-space (e.g., a vacuum).

In an embodiment, the hollow particles may exhibit a crush strength in a range of from about 1,000 psi to about 60,000 psi, alternatively in a range of from about 2,000 psi to about 40,000 psi, alternatively in a range of from about 4,000 to about 28,000, alternatively in a range of from about 2,000 psi to about 10,000 psi, alternatively in a range of from about 3,000 to 6,000 psi. Alternatively the crush strength of the hollow particles may be greater than about 60,000 psi.

In an embodiment, the hollow particles comprise carbon microballoons, cenospheres, ceramic microspheres, glass microspheres, polymer microballoons, or combinations thereof. Examples of various microspheres that are commercially available from 3M Company are SCOTCHLITE glass bubbles (hollow spheres) having a crush strength of from about 2,000 to 10,000 psi; iM30K glass bubbles also available from 3M Company having a crush strength of 28,000 psi; Z-LIGHT SPHERES ceramic microspheres having a crush strength of from about 2,000 to 60,000 psi; and ZEEOSPHERES ceramic microspheres having a crush strength of from about 2,000 to 60,000 psi. Examples of other commercially available hollow particles suitable for use in one or more embodiments include, but are not limited to, EXTENDOSPHERES beads commercially available from The PQ Corporation; FILLITE beads commercially available from Trelleberg Fillite, Inc.; and RECYCLOSPHERE beads and BIONIC BUBBLE beads, both of which are commercially available from Sphere Services, Inc. Still other commercially available hollow particles include the HGS Series glass microspheres commercially available from 3M Company, which range in size from about 80 mesh to about 100 mesh. Crush strengths, nominal densities, and density ranges of various HGS glass microspheres are provided in Table 1 below:

TABLE 1

3M ™ Glass Microsphere Properties

| Product Name | Nominal Density (g/cc) | Density Range (g/cc) | Crush Strength (psi) |
|---|---|---|---|
| HGS2000 | 0.32 | 0.29-0.35 | 2,000 |
| HGS3000 | 0.35 | 0.32-0.38 | 3,000 |
| HGS4000 | 0.38 | 0.35-0.41 | 4,000 |
| HGS5000 | 0.38 | 0.35-0.41 | 5,500 |
| HGS6000 | 0.46 | 0.43-0.49 | 6,000 |
| HGS10000 | 0.60 | 0.57-0.63 | 10,000 |

As used herein the term cenospheres refers to hollow spheres primarily comprising silica ($SiO_2$) and alumina ($Al_2O_3$). The cenosphere may be filled with gas. Cenospheres may be a naturally occurring by-product of the burning process of a coal-fired power plant. Their size may vary from about 10 to 350 μm. SPHERELITE beads, available from Halliburton Energy Services, Inc., are an example of commercially available cenospheres suitable for use in various embodiments of the disclosure.

In an embodiment, the hollow particles may also comprise hollow metal particles, hollow ceramic particles, or combinations thereof. Examples of hollow metal particles include, but are not limited to, Ti6242 microspheres, which may be prepared by sintering at temperatures of from about 794° C. to about 1350° C.; Ti6246 microspheres, which may be prepared by sintering at temperatures of from about 800° C. to about 1360° C.; Ti679 microspheres, which may be prepared by sintering at temperatures of from about 785° C. to about 1335° C.; or combinations thereof. Another example of a hollow metal particle includes, but is not limited to, hollow microspheres of Inco 718, which may be prepared by sintering at temperatures of from about 630° C. to about 1075° C. Another example of a hollow metal particle includes, but is not limited to, hollow microspheres of RR58, which may be prepared by sintering at temperatures of from about 270° C. to about 460° C. Another example of a hollow metal particle includes, but is not limited to, hollow microspheres of RZ5, which may be prepared by sintering at temperatures of from about 255° C. to about 435° C. Another example of hollow metal particles includes, but is not limited to, hollow microspheres of Jethete, which may be prepared by sintering at temperatures of from about 720° C. and 1232° C.

In an embodiment, the diameter of hollow metal microspheres may be in a range of from about 10 μm to about 1000 μm, alternatively, from about 30 μm to about 200 μm, but larger diameters of hollow metal microspheres may be used. In an alternative embodiment, hollow metal nanospheres may be used which have diameters in a range of from about 1 nm to about 1000 nm. In an embodiment, the wall thickness of the hollow metal microspheres/nanospheres may be, for example, about 5%, alternatively, about 10%, alternatively, about 15%, alternatively, about 20%, alternatively, about 25%, of the diameter of the hollow metal microspheres. The diameters and/or wall thickness of the hollow metal microspheres/nanospheres may be varied to optimize mechanical properties for a particular wellbore servicing application or to withstand anticipated wellbore conditions.

In a particular embodiment, the hollow particles may hollow ceramic beads. Suitable ceramic beads include, but are not limited to, hollow ceramic beads formed from aluminum oxide, mullite, titanium oxide, or combinations thereof. Diameters of the hollow ceramic beads may be in a range of from about 1 millimeter (mm) to about 5 mm. The wall thickness of the hollow ceramic beads may be in a range of from about 50 μm to about 250 μm. The hollow ceramic beads may have a bulk density of from about 0.2 to about 0.9 grams per cubic centimeter (g/cc). In an embodiment, the syntactic foam comprises a metal matrix material, for example, comprising aluminum, magnesium, an aluminum alloy, a magnesium alloy, or combinations thereof, and hollow ceramic beads exhibits a density in the range of from about 0.3 g/cc to about 1.0 g/cc.

In an embodiment, the matrix material comprises an epoxy resin and the hollow particles comprise glass microballoons. In another embodiment, the syntactic foam comprises glass microballoons dispersed in a matrix material comprising aluminum. In yet another embodiment, the syntactic foam comprises cenospheres dispersed in an aluminum matrix material.

In an embodiment, the syntactic foam may additionally comprise a reinforcing agent. The reinforcing agent may be dispersed within the matrix material, for example, so as to impart characteristic properties thereof (e.g., strength-related properties) to the syntactic foam. The matrix material may act to keep the reinforcing agent in a desired location and orientation and also serve as a load-transfer medium between fibers within the syntactic foam. For example, in an embodiment the syntactic foam comprises fibers. For example, the fibers may increase the tensile strength of the syntactic foam. Additionally or alternatively, in an embodiment, the syntactic foam comprises particulates.

Suitable fibers may include, but are not limited to, carbon fibers, natural (e.g., cellulosic) fibers, glass fibers, Kevlar fibers, aramid fibers, carbon nanotubes, titanium dioxide nanotubes, and combinations thereof. Examples of suitable glass fibers include, but are not limited to, E-glass, A-glass, E-CR-glass, C-glass, D-glass, R-glass, S-glass, and the like. Examples of suitable cellulosic fibers include, but are not limited to, viscose rayon, cotton, and the like. Additional examples of suitable fibers include, but are not limited to, graphite fibers, metal fibers (e.g., steel, aluminum, etc.), ceramic fibers, metallic-ceramic fibers, and combinations thereof.

The fibers may include continuous fibers, discontinuous fibers, or a combination thereof. In an embodiment, the fibers are continuous fibers. In an embodiment, the fibers are discontinuous fibers. In another embodiment, the fibers comprise chopped fibers, for example, which may be obtained by cutting continuous fibers to desired lengths. Herein a continuous fiber refers to a polycrystalline or amorphous body which has its ends outside the stress fields under consideration while a discontinuous fiber has its ends inside the stress fields under consideration. Discontinuous fibers may be obtained by a milling process or by milling chopped fibers. In an embodiment, the fiber length distribution is bimodal or trimodal.

The strength of the interface between the fibers and the matrix material may be modified or enhanced through the use of a surface coating agent. For example, the surface coating agent may provide a physico-chemical link between the fiber and the matrix material (e.g., a resin), and thus may have an impact on the mechanical and chemical properties of the final syntactic foam. The surface coating agent may be applied to fibers during their manufacture or any other time prior to the formation of the syntactic foam. Suitable surface coating agents may include, but are not limited to, surfactants, anti-static agents, lubricants, silazane, siloxanes, alkoxysilanes, aminosilanes, silanes, silanols, polyvinyl alcohol, and any combinations thereof.

In various embodiments, the syntactic foam may be characterized as exhibiting a specific gravity of in a range of from about 0.5 to about 1.5, alternatively, from about 0.5 to about 1.2, alternatively, from about 0.5 to about 1.0, alternatively from about 0.6 to about 1.0, alternatively from about 0.8 to about 1.0, alternatively from about 0.6 to about 0.8. For example, in an embodiment, the specific gravity of the syntactic foam may be less than about 1.0; in an alternative embodiment, the specific gravity of the syntactic foam may be greater than about 1.0. In an embodiment, the FCCSF may comprise a syntactic foam having a specific gravity in a range of from about 0.9 to about 1.4.

In various embodiments, the FCCSF may be characterized as exhibiting a specific gravity of from about 0.5 to about 1.5, alternatively from about 0.6 to about 1.4, alternatively from about 0.7 to about 1.3, alternatively, from about 0.8 to about 1.2, alternatively from about 0.6 to about 0.8, alternatively, from about 0.8 to about 1.0, alternatively, from about 1.0 to about 1.4. The syntactic foam materials (e.g., the matrix material, the hollow particle material, and any additional components), the average diameter of the hollow particles, the thickness of the walls of the hollow particles, the weight fractions of the individual syntactic foam materials, and the overall volume fraction of the hollow particles may be adjusted by one having ordinary skill in the art with the aid of this disclosure to achieve the desired overall density and/or specific gravity of the FCCSF. As will be appreciated by one of skill in the art upon viewing this disclosure, the density and/or specific gravity of a given FCCSF may be dependent upon one or more characteristics (e.g., density) of a fluid in which it is intended that such an FCCSF will be used.

Herein, an object immersed in a fluid wherein the density of the object is less than the density of the surrounding fluid ($\rho_{object} < \rho_{fluid}$) shall be referred to as having "positive buoyancy." An object immersed in a fluid wherein the density of the object is greater than the density of the surrounding fluid ($\rho_{object} > \rho_{fluid}$) shall be referred to as having "negative buoyancy." Also herein, an object immersed in a fluid wherein the density of the object is equal to, alternatively, substantially equal to, the density of the fluid ($\rho_{object} = \rho_{fluid}$) shall be referred to as having "neutral buoyancy."

In various embodiments, the FCCSF may be configured to maintain neutral or positive buoyancy for example, within a wellbore fluid (e.g., an aqueous wellbore fluid, an oleaginous wellbore fluid, or combinations thereof) under typical downhole conditions. For example, in an embodiment, the FCCSF may be characterized as exhibiting a relative gravity, with respect to a given wellbore servicing fluid, of from about 0.5 to about 1.5, alternatively from about 0.6 to about 1.4, alternatively from about 0.7 to about 1.3, alternatively, from about 0.8 to about 1.2, alternatively from about 0.6 to about 0.8, alternatively, from about 0.8 to about 1.0, alternatively, from about 1.0 to about 1.4. As another example, the FCCSF may be configured to maintain neutral and/or positive buoyancy in a particular wellbore environment (e.g., at ambient wellbore temperature, pressure, wellbore fluid composition, well depth and associated hydrostatic fluid pressure, etc.) For example, the FCCSF may be configured to maintain a neutral or a positive buoyancy (that is, the overall buoyancy of the FCCSF may be adjusted/manipulated) by adjusting the amount of syntactic foam in the FCCSF, by selecting a syntactic foam having the desired density (e.g., from among commercially available foams and/or by designing a syntactic foam as described above), by selecting and/or adjusting an amount of ballast or other mass (e.g., size/weight of additional internal components of the type discussed herein) carried by the FCCSF, or combinations thereof.

In some circumstances, the tendency of the FCCSF to rise via positive buoyancy and/or maintain a static position in the wellbore via neutral buoyancy may be augmented, inhibited, and/or otherwise altered by conditions in the wellbore. For example, fluid dynamic forces may be applied to the FCCSF by a circulating fluid and/or a rising formation fluid in which the FCCSF is immersed. In an embodiment, a FCCSF may be provided having a surface profile and a density configured to maintain an effective neutral or an effective positive buoyancy of the FCCSF when submerged in a wellbore servicing fluid under downhole fluid dynamic conditions. As used herein, the terms "effective neutral buoyancy" and "effective positive buoyancy" refer to the characteristic of a submerged object to exhibit buoyancy behavior under a given set of fluid dynamic conditions, wherein all or part of the behavior of the submerged object is not attributable to relative difference in density between the submerged object and the surrounding fluids.

In embodiments, the syntactic foam exhibits a hydrostatic crush pressure sufficient to withstand hydrostatic pressures as may be present within a wellbore environment. In an embodiment, the syntactic foam has a hydrostatic crush pressure (e.g., a gauge pressure) of greater than or equal to about 40,000 psi, alternatively greater than or equal to about 19,000 psi, alternatively greater than or equal to about 17,500 psi., alternatively greater than or equal to about 15,000 psi, alternatively greater than or equal to about 12,500 psi., alternatively greater than or equal to about 10,000 psi., alternatively greater than or equal to about 8,000 psi, alternatively greater than or equal to about 6,000 psi., alternatively greater than or equal to about 4,000 psi.

For example, hydrostatic crush pressures of the syntactic foams as disclosed herein may be determined by preparing a standard ASTM test sample of the syntactic foam, heating the syntactic foam, and then subjecting the sample to increasing pressures at a rate equivalent to an increase of 24 MPa (3500 PSI) every 60 seconds. The failure point of the test material is recorded when any drop is witnessed on the testing machine's load deflection curve. Alternatively, the hydrostatic crush pressure (HCP) of a syntactic foam may be measured by testing a sample of the syntactic foam material in accordance with ASTM D2736. HCP is defined as the point of pressure in Bar, where the material when subjected to an increasing pressure of 1-2 Bar/second has lost 5% of its initial volume.

In various embodiments, the FCCSF may comprise one or more commercially available syntactic foams. Commercially available syntactic foams suitable for use in various embodiments of the disclosure may be obtained from, for example, CRG Industries of Dayton, Ohio under the tradename ADVANTIC; CMT Materials of Attleboro, Mass. under the tradenames HYTAC, HYVAC, REN SHAPE, METAPOR, and PROTOBLOCK; and Gurit Holding AG of Wattwil, Switzerland under the tradename CORECELL. However, the commercially available syntactic foams enumerated herein are provided for the purposes of example only, and are not an exhaustive list of all commercially available syntactic foams suitable for use in one or more of the various embodiments of the disclosure.

In an embodiment, the FCCSF may comprise a coating, such as a resin coating, covering an outer surface of the syntactic foam. The coating may comprise the same material as the matrix material of the FCCSF, a different material, or a combination thereof. The coating may cover a portion of the outer surface of the FCCSF or the coating may cover the entire outer surface of the FCCSF, encapsulating the FCCSF. Materials suitable for the resin coating include, but are not limited to, resin materials or surface coating agents (e.g., surfactants, anti-static agents, lubricants, silazane, siloxanes, alkoxysilanes, aminosilanes, silanes, silanols, polyvinyl alcohol) described herein with respect to the matrix material. The coating may provide the FCCSF with improved mechanical properties such as an increased hydrostatic crush pressure. The coating may provide improved protection for the hollow particles contained within the matrix material of the syntactic foam. While not wishing to be bound by theory, the coating may protect the hollow particles against externally applied impact loads, from corrosion from the surrounding fluid, and/or or from erosion during placement or in operation (erosion from the hitting the tubing or erosion from the proppant).

Alternatively or additionally, in an embodiment the FCCSF may comprise a shell, such as a metal shell, covering an outer surface of the FCCSF. The shell may cover the FCCSF or a portion thereof (e.g., the syntactic foam) directly or, alternatively, one or more other materials may be present between the syntactic foam and the shell. The shell may partially or completely encapsulate the FCCSF. In embodiments where the FCCSF comprises both a coating and a shell, the coating may be disposed between the syntactic foam and the shell. Alternatively, the shell may be disposed between the coating and the syntactic foam.

In an embodiment where the shell is a metal, metals suitable for the metal shell include, but are not limited to, aluminum, copper, beryllium, magnesium, iron, titanium, alloys thereof, oxides thereof, and combinations thereof. Suitable iron alloys include, but are not limited to, stainless steel alloys, such as 316 stainless steel. Commercially available nickel alloys suitable for use in various embodiments of the disclosure may be obtained from, for example, Special Metals Corporation of Huntington, W. Va. under the tradename INCOLOY, and from Haynes International, Inc. of Kokomo, Ind. under the tradename HASTELLOY. In an embodiment, the metal shell comprises aluminum, titanium, alloys thereof, or any combinations thereof.

In an embodiment, and not seeking to be bound by theory, the metal shell may improve the overall mechanical properties of the FCCSF. For example, the metal shell may increase the overall hydrostatic crush pressure of the FCCSF. The metal shell may also provide improved protection for the hollow particles contained within the matrix material of the syntactic foam. For example, while not wishing to be bound by theory, the metal shell may protect the hollow particles against externally applied impact loads.

In an embodiment, the FCCSF, has an outer shell comprising metal, and has an overall specific gravity of less than or equal to about one. In an embodiment, the FCCSF comprises a sphere of syntactic foam, alternatively, substantially of syntactic foam, covered by a metal shell, and has an overall specific gravity of less than or equal to about one, and, optionally, one or more internal subcomponents. The type of metal or metals, the thickness, the porosity, and the total area of coverage of the metal shell may be selected by one having ordinary skill in the art with the aid of this disclosure to provide an overall specific gravity of FCCSF of less than or equal to about one.

In various embodiments, the FCCSF may be provided with a coating, a metal shell, or both, for example, to provide the FCCSF with improved properties, additional properties, or a combination thereof. Such properties may include, for example, chemical resistance (e.g., corrosion resistance, resistance to scale formation), thermal resistance or conductivity (to protect internal components from elevated wellbore temperatures), electrical resistance or conductivity, and magnetic field permeability or impermeability. With the aid of this disclosure, one of ordinary skill in the art may select the characteristics of a coating, a shell, or a combination thereof suitable to provide a FCCSF with one or more desired properties. Characteristics of the coating, the shell, or combinations thereof that may be adjusted include, for example, material selection, thickness, porosity, and surface area.

In some embodiments, the syntactic foam of the FCCSF is coated with an acid-resistant material. For example, a FCCSF may be provided with a coating resistant to hydrochloric acid, formic acid, acetic acid, hydrofluoric acid, or combinations thereof. An acid-resistant coating may be advantageous in cases where the FCCSF comprises a material sensitive to one or more acids and it is anticipated that the FCCSF will be exposed to one of those acids in a wellbore environment. For example, when syntactic foams comprising glass microbeads and/or microspheres are exposed to hydrofluoric acid, the glass beads become compromised. A hydrofluoric acid resistant coating may be advantageous in applications carried out in the presence of hydrofluoric acid but where it is otherwise desirable to utilize FCCSF's where glass beads are present in the syntactic foam. Examples of suitable acid-resistant materials are disclosed above and in the working examples section.

In various embodiments, the FCCSF may comprise a reducible material (e.g., the matrix material may comprise a reducible material). As used herein, a "reducible material" refers to any material that facilitates size (e.g., volume) reduction of the FCCSF under conditions that may naturally encountered, induced, and/or artificially created in a wellbore environment. In various embodiments, the reducible material may comprise a dissolvable material, a meltable material, a consumable material, a degradable material (including biodegradable materials), a frangible material, an erodible material, a thermally degradable material, a boilable material, an ablatable material, or combinations thereof. In various embodiments, one or more reducible components may be incorporated into the syntactic foam of the FCCSF (for example as the matrix material or as a component thereof, e.g., a bulk and/or binder component of the matrix material), a non-syntactic foam portion of the FCCSF, a component of the FCCSF, or a combination thereof. Also, as discussed designation of a particular reducible material as dissolvable, meltable, etc. is non-limiting and non-exclusive, and the same material may have more than one designation (e.g., various materials may overlap designations). In one embodiment, the reducible material may be effective to increase the rate of such a size reduction after the reducible material experiences a phase change.

In an embodiment, and not intending to be bound by theory, incorporating one or more reducible materials into a FCCSF, the probability of recovering, relocating, and/or removing the FCCSF may be improved. For example, in the event that a FCCSF comprising a reducible material (e.g., dissolvable material) is trapped or stuck in a particular portion of the wellbore, reduction (e.g., dissolution) of some of the reducible (e.g., dissolvable) material may allow the FCCSF to be reduced in size (e.g., by portions of the FCCSF breaking off and/or dissolving) sufficient for the FCCSF to break free. In instances where recovery of the FCCSF cannot be achieved and/or is undesirable, deterioration of one or more reducible materials present in the FCCSF may reduce or eliminate the FCCSF as an impediment to wellbore operations by reducing the size of the FCCSF enough to liberate and relocate the FCCSF. Additionally or alternatively, the FCCSF may be deteriorated and/or consumed as a consequence of the deterioration of one or more reducible materials therein to a degree (e.g., >50, 60, 70, 80, 90, 95, 99, % by weight and/or completely deteriorated) such that no structural impediment exists to continued wellbore servicing operations.

In various embodiments, a FCCSF comprises two or more different reducible materials (e.g., two different dissolvable materials; a dissolvable material and a combustible material, etc.). By including multiple distinct reducible materials, the recovery, relocation, and/or consumption of the FCCSF may be further improved by expanding the options available to an operator to reduce the size of the FCCSF. In instances where the necessary wellbore conditions are not available to enable size reduction of a FCCSF via the size-reduction mechanism of one reducible material, size reduction may still be achieved if conditions are sufficient to enable the size-reduction mechanism of another reducible material present in the FCCSF.

In an embodiment, the FCCSF comprises a dissolvable reducible material (e.g., as a matrix material). The dissolvable material may comprise an oil-soluble material, a water-soluble material, an acid-soluble material, or a combination thereof. As used herein, the term "oil-soluble" refers to a material capable of dissolving when exposed to an oleaginous fluid, for example, under downhole conditions. Suitable oil-soluble materials include, but are not limited to, oil-soluble polymers, oil-soluble resins, oil-soluble elastomers, polyethylenes, carbonic acids, amines, and waxes. As used herein, the term "water-soluble" refers to a material capable of dissolving when exposed to an aqueous wellbore fluid, for example, under downhole conditions. Suitable water-soluble materials include, but are not limited to, water-soluble polymers, water-soluble elastomers, carbonic acids, salts, amines, and in inorganic salts. As used herein, the term "acid-soluble" refers to a material capable of dissolving when exposed to an acidic fluid (e.g., an acidizing fluid, aqueous acid solution, etc.), for example, under downhole conditions. The presence of one or more dissolvable materials in the FCCSF may facilitate removal of the FCCSF from a particular portion of the wellbore.

In various embodiments, the FCCSF may comprise a meltable reducible material (e.g., as a matrix material). As used herein, a "meltable material" refers to a material that melts (undergoes and phase change from solid to liquid) under one or more downhole conditions. Examples of meltable materials that can be melted at downhole conditions include, but are not limited to, hydrocarbons having greater than or equal to about 30 carbon atoms; polycaprolactones; paraffins and waxes; carboxylic acids, such as benzoic acid, and carboxylic acid derivatives.

In some embodiments, the meltable material comprises a eutectic material. The eutectic alloy remains in a solid state at ambient surface temperatures. Eutectic materials are characterized by forming very regular crystalline molecular lattices in the solid phase. Eutectic materials are chemical compounds that have the physical characteristic of changing phase (melting or solidifying) at varying temperatures: melting at one temperature and solidifying at another. The temperature range between which the melting or solidification occurs is dependent on the composition of the eutectic material. When two or more of these materials are combined, the eutectic melting point is lower than the melting temperature of any of the composite compounds. The composite material may be approximately twice as dense as water, weighing approximately 120 pounds per cubic foot. In an embodiment, the eutectic material comprises a salt-based eutectic material, a metal-based eutectic material, or a combination thereof. Salt-based eutectic material can be formulated to work at temperatures as low as 30° F. and as high as 1100° F. Metal-based eutectic materials can operate at temperatures exceeding 1900° F. Examples of a suitable eutectic material include metallic alloys, for example, alloys of tin, bismuth, indium, lead, cadmium, or combinations thereof.

Not intending to be bound by theory, when a solid eutectic material is heated to the fusion (melting) point, it changes phase to a liquid state. As it melts, it absorbs latent heat. When the temperature of the eutectic liquid solution phase is lowered to below the melting point, it does not solidify, but becomes a "super-cooled" liquid. The temperature must be lowered to the eutectic point before it will change phase back to a solid. When the temperature is lowered to the eutectic temperature, the liquid-to-solid phase change occurs almost instantaneously, and forms a homogenous crystalline solid with significant mechanical strength.

The phase change from liquid to solid can also be triggered by inducing the initiation of the crystalline process. This may be accomplished by introducing free electrons into the liquid by various means, for example, by deformation of a piece of electrically conductive metal.

Phase-changing salts are extremely stable. If they are not heated above their maximum operating temperature range, it is believed that they may operate indefinitely. At least some eutectic salts are environmentally safe, non-corrosive, and water-soluble. Moreover, as the working-temperature range of the eutectic salt may increase, the strength of the crystal lattice may increase and the physical hardness of the solid phase may increase.

In an embodiment, eutectic compositions suitable for use in the FCCSF disclosed herein include, but are not limited to, eutectic materials capable of melting at temperatures and pressures that may be encountered in the wellbore environment. A suitable eutectic salt would be, for example, a eutectic salt that melts above about 200° C. and solidifies at about 160° C. Examples of eutectic salt compositions suitable for use in the FCCSF disclosed herein include, but are not limited to, mixtures of NaCl, KCl, $CaCl_2$, $KNO_3$ and $NaNO_3$. In a non-limiting exemplary embodiment, a FCCSF comprises a high temperature draw salt such as 430 Parkettes® (Heatbath Corporation). In an embodiment, an aggregate such as a microglass bead or a glass fiber may be used to act as a reinforcement to increase the mechanical strength of the eutectic salt.

In various embodiments, the FCCSF may comprise a consumable reducible material (e.g., as a matrix material) that is at least partially consumed when exposed to heat and a source of oxygen. In an embodiment, consumption of the consumable reducible material due to exposure to heat and oxygen may cause the portions of the flowable component comprising the consumable reducible material to lose structural integrity, for example, so as to crumble under the application of a relatively small external loads and/or internal stresses. In such an embodiment, such loads may be applied to the wellbore and controlled in such a manner so as to cause structural failure of the FCCSF.

In an embodiment, the consumable reducible material may comprise a metal material, a thermoplastic material, a phenolic material, a composite material, or combinations thereof. The consumable thermoplastic material may comprise polyalphaolefins, polyaryletherketones, polybutenes, nylons or polyamides, polycarbonates, thermoplastic polyesters, styrenic copolymers, thermoplastic elastomers, aromatic polyamides, cellulosics, ethylene vinyl acetate, fluoroplastics, polyacetals, polyethylenes, polypropylenes, polymethylpentene, polyphenylene oxide, polystyrene, PTFE (e.g., "Teflon™"), or combinations thereof. In an embodiment, the consumable reducible material comprises magnesium, which is converted to magnesium oxide when exposed to heat and a source of oxygen, as illustrated by the chemical reaction below:

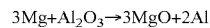
$$3Mg + Al_2O_3 \rightarrow 3MgO + 2Al$$

In various embodiments, an FCCSF comprising a consumable reducible material may further comprise a fuel load. The fuel load may be formed from materials that, when ignited and burned, produce heat and an oxygen source, which in turn may act as the catalysts for initiating burning of consumable components of the FCCSF. The fuel load may comprise a flammable, non-explosive solid. A non-limiting example of a suitable fuel load is thermite. In one embodiment, a composition of thermite comprises iron oxide, or rust ($Fe_2O_3$), and aluminum metal power (Al). When ignited and burned, thermite reacts to produce aluminum oxide ($Al_2O_3$) and liquid iron (Fe), which is a molten plasma-like substance. The chemical reaction is:

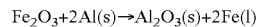
$$Fe_2O_3 + 2Al(s) \rightarrow Al_2O_3(s) + 2Fe(l)$$

The FCCSF may also comprise a firing mechanism, such as an electronic igniter, with a heat source to ignite the fuel load and a device to activate the heat source. In an embodiment, the FCCSF comprises consumable material, a fuel source configured to initiate burning of the magnesium, and an igniter configured to ignite the fuel source. In an embodiment, the FCCSF comprises magnesium, a thermite fuel source is configured to initiate burning of the magnesium, and an electronic igniter configured to ignite the thermite fuel source. Upon ignition of the fuel source by the electronic igniter, the thermite forms a high-temperature plasma which causes the magnesium to react with oxygen and form a magnesium oxide slag.

In various embodiments, the FCCSF may comprise a degradable reducible material (e.g., as a matrix material). As used herein, the term "degradable materials" refer to materials that readily and irreversibly undergo a significant change in chemical structure under specific environmental conditions that result in the loss of some properties. For example, the degradable material may undergo hydrolytic degradation that ranges from the relatively extreme cases of heterogeneous (or bulk erosion) to homogeneous (or surface erosion), and any stage of degradation in between. In some embodiments, the components are degraded under defined conditions (e.g., as a function time, exposure to chemical agents, etc.), for example, to such an extent that the components are structurally compromised and will no longer function for their intended purpose. In an alternative embodiment, the components can be degraded under defined conditions, for example, to such an extent that the component no longer maintains its original form and is transformed from a component having defined structural features consistent with its intended function to a plurality of masses lacking features consistent with its intended function.

In some embodiments, the degradable material comprises a material capable of being degraded as described previously herein and that may be formed into the components. The degradable material may be further characterized as possessing physical and/or mechanical properties that are compatible with its use in a wellbore servicing operation. In choosing the appropriate degradable material, one may consider the degradation products that will result. Also, one may select a degradable material having degradation products that do not adversely affect other operations or components. One of ordinary skill in the art, with the benefit of this disclosure, will be able to recognize which degradable materials would produce degradation products that would adversely affect other operations or components.

In some embodiments, the FCCSF comprises a degradable polymer. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. In an embodiment, the degradable polymer may be chemically modified (e.g., chemical functionalization) in order to adjust the rate at which these materials degrade. Such adjustments may be made by one of ordinary skill in the art with the benefits of this disclosure. Further, the environment to which the polymer is subjected may affect how it degrades, e.g., temperature, presence of moisture, oxygen, microorganisms, enzymes, pH, and the like.

Examples of degradable polymers suitable for use in this disclosure include, but are not limited to, homopolymers, random, block, graft, and star- and hyper-branched aliphatic polyesters. Specific examples of suitable polymers include, but are not limited to, polysaccharides such as dextran or cellulose; chitin; chitosan; proteins; orthoesters; aliphatic polyesters; poly(lactide); poly(glycolide); poly(ε-caprolactone); poly(hydroxybutyrate); poly(anhydrides); aliphatic polycarbonates; poly(orthoesters); poly(amino acids); poly(ethylene oxide); and polyphosphazenes. Such degradable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process.

In some embodiments, one or more FCCSF's are also comprised of a biodegradable material. As used herein, "biodegradable materials" refer to materials comprised of organic components that degrade over a relatively short period of time. Typically such materials are obtained from renewable raw materials. In some embodiments, the components are comprised of a biodegradable polymer comprising aliphatic polyesters, polyanhydrides or combinations thereof.

In some embodiments, one or more FCCSF's are also comprised of a biodegradable polymer comprising an aliphatic polyester. Aliphatic polyesters degrade chemically, inter alia, by hydrolytic cleavage. Hydrolysis can be catalyzed by either acids or bases. Generally, during the hydrolysis, carboxylic end groups are formed during chain scission, and this may enhance the rate of further hydrolysis. This mechanism is known in the art as "autocatalysis," and is thought to make polyester matrices more bulk eroding.

Suitable aliphatic polyesters have the general formula of repeating units shown below:

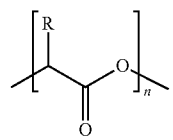

Formula I where n is an integer between 75 and 10,000 and R is selected from the group consisting of hydrogen, alkyl, aryl, alkylaryl, acetyl, heteroatoms, and mixtures thereof. In some embodiments, the aliphatic polyester is poly(lactide). Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to Formula I without any limitation as to how the polymer was made such as from lactides, lactic acid, or oligomers, and without reference to the degree of polymerization or level of plasticization.

The lactide monomer exists generally in three different forms: two stereoisomers L- and D-lactide and racemic D,L-lactide (meso-lactide). The oligomers of lactic acid, and oligomers of lactide are defined by the formula:

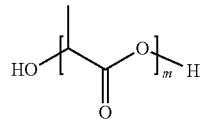

Formula II where m is an integer: $2 \leq m \leq 75$. Alternatively m is an integer: $2 \leq m \leq 10$. These limits correspond to number average molecular weights below about 5,400 and below about 720, respectively.

In some embodiments, the aliphatic polyester is poly(lactic acid). D-lactide is a dilactone, or cyclic dimer, of D-lactic acid. Similarly, L-lactide is a cyclic dimer of L-lactic acid. Meso D,L-lactide is a cyclic dimer of D-, and L-lactic acid. Racemic D,L-lactide comprises a 50/50 mixture of D-, and L-lactide. When used alone herein, the term "D,L-lactide" is intended to include meso D,L-lactide or racemic D,L-lactide. Poly(lactic acid) may be prepared from one or more of the above. The chirality of the lactide units provides a means to adjust degradation rates as well as physical and mechanical properties. Poly(L-lactide), for instance, is a semicrystalline polymer with a relatively slow hydrolysis rate. This may be advantageous for downhole operations where slow degradation may be appropriate. Poly(D,L-lactide) is an amorphous polymer with a faster hydrolysis rate. This may be advantageous for downhole operations where a more rapid degradation may be appropriate.

The stereoisomers of lactic acid may be used individually or combined in accordance with the present disclosure.

Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified by blending, copolymerizing or otherwise mixing high and low molecular weight polylactides; or by blending, copolymerizing or otherwise mixing a polylactide with another polyester or polyesters.

The aliphatic polyesters may be prepared by substantially any of the conventionally known manufacturing methods such as those described in U.S. Pat. Nos. 6,323,307; 5,216,050; 4,387,769; 3,912,692; and 2,703,316.

In some embodiments, the biodegradable polymer comprises a plasticizer. Suitable plasticizers include but are not limited to derivatives of oligomeric lactic acid, selected from the group defined by the formula:

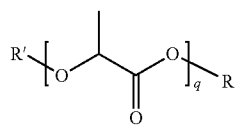

Formula III where R is a hydrogen, alkyl, aryl, alkylaryl, acetyl, heteroatom, or a mixture thereof and R is saturated, where R' is a hydrogen, alkyl, aryl, alkylaryl, acetyl, heteroatom, or a mixture thereof and R' is saturated, where R and R' cannot both be hydrogen, where q is an integer: $2 \leq q \leq 75$; and mixtures thereof. Alternatively q is an integer: $2 \leq q \leq 10$. As used herein the term "derivatives of oligomeric lactic acid" includes derivatives of oligomeric lactide.

The plasticizers may be present in any amount that provides the desired characteristics. For example, the various types of plasticizers discussed herein provide for (a) more effective compatibilization of the melt blend components used in forming a syntactic foam); (b) improved processing characteristics during the blending and processing steps in forming a syntactic foam; and (c) control and regulate the sensitivity and degradation of the polymer by moisture when forming a syntactic foam. For pliability, plasticizer is present in higher amounts while other characteristics are enhanced by lower amounts. The compositions allow many of the desirable characteristics of pure nondegradable polymers. In addition, the presence of plasticizer facilitates melt processing, and enhances the degradation rate of the compositions in contact with the wellbore environment. The intimately plasticized composition may be processed into a final product (e.g., a FCCSF) in a manner adapted to retain the plasticizer as an intimate dispersion in the polymer for certain properties. These can include: (1) quenching the composition at a rate adapted to retain the plasticizer as an intimate dispersion; (2) melt processing and quenching the composition at a rate adapted to retain the plasticizer as an intimate dispersion; and (3) processing the composition into a final product in a manner adapted to maintain the plasticizer as an intimate dispersion. In certain embodiments, the plasticizers are at least intimately dispersed within the aliphatic polyester.

In some embodiments, the biodegradable material is a poly(anhydride). Poly(anhydride) hydrolysis proceeds, inter alia, via free carboxylic acid chain-ends to yield carboxylic acids as final degradation products. The erosion time can be varied by variation of the polymer backbone. Examples of suitable poly(anhydrides) include without limitation poly (adipic anhydride), poly(suberic anhydride), poly(sebacic anhydride), and poly(dodecanedioic anhydride). Other suitable examples include but are not limited to poly(maleic anhydride) and poly(benzoic anhydride).

In various embodiments, at least a portion of one or more of the FCCSF's are self-degradable. Namely, at least a portion of the one or more FCCSF's are formed from biodegradable materials comprising a mixture of a degradable polymer, such as the aliphatic polyesters or poly(anhydrides) previously described, and a hydrated organic or inorganic solid compound. The degradable polymer will at least partially degrade in the releasable water provided by the hydrated organic or inorganic compound, which dehydrates over time when heated due to exposure to the wellbore environment.

Examples of the hydrated organic or inorganic solid compounds that can be utilized in the self-degradable components include, but are not limited to, hydrates of organic acids or their salts such as sodium acetate trihydrate, L-tartaric acid disodium salt dihydrate, sodium citrate dihydrate, hydrates of inorganic acids or their salts such as sodium tetraborate decahydrate, sodium hydrogen phosphate heptahydrate, sodium phosphate dodecahydrate, amylose, starch-based hydrophilic polymers, and cellulose-based hydrophilic polymers.

In some embodiments, the one or more FCCSF's comprising one or more degradable materials of the type described herein are degraded subsequent to the performance of their intended function. Degradable materials and method of utilizing same are described in more detail in U.S. Pat. No. 7,093,664.

In an embodiment, the FCCSF may Garolite. In an exemplary embodiment, the FCCSF may comprise High-Temperature Garolite (G-11 Epoxy Grade). In other embodiments, the syntactic foam of the FCCSF may comprise resin or epoxy matrix materials that are at least partially degradable by exposure to water.

In some embodiments, components of the FCCSF may be held, adhered, and/or otherwise maintained in a relative spatial relationship using an epoxy resin. In an embodiment, components of the FCCSF are held, adhered, and/or otherwise maintained in a relative spatial relationship using Weld-Aid epoxy resin matrix material.

In various embodiments, the FCCSF may comprise a disintegrable reducible material (e.g., as a matrix material). Materials that can disintegrate include plastics such as PLA, polyamides and composite materials comprising degradable plastics and non-degradable fine solids. It should be noted that some degradable materials pass through a disintegration stage during the degradation process; an example is PLA, which may turn into frangible materials before complete degradation. In an embodiment, disintegration of at least one component of the FCCSF may yield smaller pieces that are flushed away or otherwise promote removal of the FCCSF.

In an embodiment, the syntactic foams may be formed by melt mixing (e.g., compounding or extruding) the matrix material with the hollow particles, optionally with foaming agents, if needed (e.g., inert gas such as nitrogen or carbon dioxide, chemical blowing agents, etc.). For example, a resin matrix material may be compounded or extruded with glass microspheres. The syntactic foam may be provided with the desired specific gravity by controlling the mass flow rate of each of the syntactic foam components during the compounding process. The appropriate mixing ratio for compounding the material with the hollow particles may be determined, for example, by applying the law of mixtures, which is Equation 1 as follows:

$$\frac{m_1}{m_2} = \frac{SG_1 SG_2 - SG_1 SG_F}{SG_2 SG_F - SG_1 SG_2} \qquad \text{Equation 1}$$

Where:
- $m_1$ is the mass rate of the microspheres
- $m_2$ is the mass rate of the matrix material
- $SG_1$ is the specific gravity of the microspheres
- $SG_2$ is the specific gravity of the matrix material
- $SG_F$ is the specific gravity of the final mixture.

In an embodiment, the mixing ratio, on a volumetric basis, of hollow particles/microspheres to matrix material is less than or equal to about 1.0. In another embodiment, the matrix material is present in an amount of greater than about 50% by weight based on the combined weight of the matrix material and the hollow particles.

Referring again to block 1100 of FIG. 2, the step of providing a FCCSF may comprise forming a FCCSF from syntactic foam. In an embodiment, the FCCSF is formed into a frac ball. In another embodiment, a FCCSF is formed into a cementing plug. In an embodiment, the FCCSF may be completely comprised of syntactic foam or, alternatively, less than the entirety of the FCCSF may comprise syntactic foam. In an embodiment, a FCCSF comprising a cementing plug is provided with a drillable core which comprises syntactic foam. In another embodiment, one or more subcomponents of the FCCSF are encapsulated within a syntactic foam body of a frac ball.

In an embodiment, forming the FCCSF may be carried out by any suitable means, as may be apparent to one of ordinary skill in the art with the aid of this disclosure. For example, in various embodiments a FCCSF may be formed by machining a piece of syntactic foam into an intended shape of the FCCSF. Depending on the design and/or intended use of the FCCSF, one or more voids configured to receive one or more subcomponents may also be machined into the FCCSF, and the one or more subcomponents may be placed in the voids thereafter. The one or more voids may be formed (e.g., by machining) before, during, after, or combinations thereof relative to the occurrence of the machining of the piece of syntactic foam into the shape of the FCCSF. After being placed into the one or more voids, the subcomponents may be encapsulated within the FCCSF by filling in and/or covering the exposed portions of each void with additional syntactic foam (e.g., via a potting procedure). The exposed portions may be filled in and/or covered with the additional syntactic foam such that air voids are eliminated. In the case of a frac ball, additional syntactic foam may fill in and/or cover the exposed portions of the voids such that the spherical shape of the frac ball is maintained.

In some embodiments, the FCCSF is formed about concurrently with or downstream from formation of the syntactic foam, for example forming an FCCSF in a mold (e.g., injection mold) from molten syntactic foam exiting an extruder line. In an embodiment, formation of a FCCSF may be achieved by injection molding. In one such embodiment, a method of forming a FCCSF comprises providing a mold having a profile characteristic of a FCCSF used in a wellbore (e.g., a ball or a plug design), injecting syntactic foam into the mold, and recovering the FCCSF from the mold. The profile of the mold may be characteristic of the FCCSF, in whole or in part. For example, the mold may have a profile such that a syntactic foam article injection molded therein assumes at least a portion of the shape of the FCCSF (e.g., a nose and/or body of a FCCSF). The mold may also comprise one or more mounts adapted to maintain a position of one or more subcomponents of the FCCSF during injection of the syntactic foam into the mold. In this way, syntactic foam may be injected around the one or more subcomponents of the FCCSF, at least partially enclosing the one or more subcomponents within a body of injection molded syntactic foam. Mounts may additionally be utilized to maintain subcomponents in fixed positions while syntactic foam is injected into the mold and around the subcomponents and also while the injected syntactic foam sets, thus allowing more complex designs to be formed by injection molding. For example, a ballasted frac ball may be provided by securing a weight in a peripheral position (e.g., away from the center) of the mold during injection molding. Syntactic foam may then be injected around the ballast and the mold allowed to set or cure, for example, thereby providing a ballasted frac ball comprising syntactic foam.

Subcomponents suitable for incorporation into a FCCSF utilizing one or more of the techniques disclosed herein include, but are not limited to, magnets, electronics, batteries, and ballasts. Depending on the subcomponent to be incorporated and the syntactic foam utilized, it may be advantageous to utilize a particular fabrication technique over another to form the FCCSF. For example, it may be advantageous to utilize machining, rather than injection molding, to form a FCCSF comprising a temperature-sensitive subcomponent (e.g., batteries, temperature-sensitive electronics, etc.) and/or a syntactic foam that requires high temperatures to be sufficiently workable for injection-molding.

In an embodiment, a coating, layer, or shell (e.g., metal shell) is placed and/or formed in the mold, following by injection of syntactic foam to form coated or shell-encased FCCSFs. In an embodiment, a method of servicing a wellbore is provided wherein a FCCSF and a metal shell is formed by injecting syntactic foam into the metal shell. In such an embodiment, the outer metal shell functions as a mold for the syntactic foam during the injection molding, and then as a protective outer layer of the FCCSF when the FCCSF is used in furtherance of a wellbore servicing operation. In an embodiment, the metal shell may be provided with one or more ports wherein syntactic foam may be injected. In embodiments where the FCCSF contains one or more subcomponents, the subcomponents may be placed within the metal shell prior to injection of the syntactic foam, maintained in a fixed position via mounts attached to the inside surface of the metal shell, and then the syntactic foam may be injected into the metal shell thereafter. The materials of the metal shell may be selected to withstand the temperatures required to inject the syntactic foam. Additionally or alternatively, a syntactic material may be selected that has an injection molding temperature suitable for use with a particular metal shell composition. By using the metal shell as the injection mold, manufacturing of the FCCSF may be simplified and capital costs reduced (e.g., by eliminating the design, manufacture, and use of molds). In another embodiment, the outer shell is constructed from a composite such as a fiberglass-reinforced epoxy. In another embodiment, the outer shell is constructed from a flexible material such as rubber.

In an embodiment, a method of servicing a wellbore is provided wherein a FCCSF and an outer shell is formed at a wellsite. The method generally comprises providing a prefabricated outer shell at a wellsite, injection molding syntactic foam into the prefabricated outer shell to form the FCCSF, allowing the syntactic foam to set or cure, introducing the FCCSF into the wellbore, and utilizing the FCCSF in furtherance of a wellbore servicing operation (e.g., as will be disclosed herein). In an embodiment, the prefabricated outer shell contains one or more subcomponents, which are held in a fixed position via mounts attached to an inside surface of the metal shell. In another embodiment, one or more subcomponents are incorporated into the outer shell (e.g., held in a fixed position via mounts attached to an inside surface of the outer shell) after the outer shell is provided at the wellsite and before the injection molding. Injecting the syntactic foam directly into a prefabricated metal shell may provide a simplified process for forming the FCCSF at the wellsite, may reduce or eliminate delays due to ordering and delivering downhole tools needed for unanticipated applications, and/or may allow wellsite operators to create wellbore tools having customized properties onsite (e.g. by incorporating particular subcomponents or selecting a syntactic foam having properties desired for a particular application).

Although separately described, the techniques described herein for forming the FCCSF are not mutually exclusive. In an embodiment, the shape of a FCCSF is provided using an injection molding technique. For example, upon selecting or setting of the mold for the desired shape, one or more subcomponents are placed within the mold, and then the one or more subcomponents are encapsulated within the FCCSF. In various embodiments, formation of the FCCSF may be accomplished at an offsite manufacturing facility or at a wellsite where the FCCSF is intended to be used. Additionally or alternatively, a portion of the forming of the FCCSF may be achieved offsite and the remainder of the forming carried out at the wellsite.

In various embodiments, one or more means of forming a FCCSF disclosed herein may be carried out as part of a method of servicing a wellbore. In an embodiment, a method of servicing a wellbore includes forming a FCCSF; providing the FCCSF to a wellsite operator, wherein the wellsite operator introduces the FCCSF into the wellbore; flowing the FCCSF in the wellbore; and then recovering the FCCSF by flowing the FCCSF to the surface.

Referring again to FIG. 2, the method 1000 may progress to block 1200 wherein the FCCSF may be introduced into a wellbore such as the wellbore 114 of FIG. 1. The FCCSF may be dropped into a work string, casing string, or otherwise that is disposed within the wellbore and/or pumped into the wellbore with one or more wellbore servicing fluids.

Still referring to FIG. 2, the method may progress to block 1300 wherein the FCCSF is flowed into the wellbore. The FCCSF may be immersed in a wellbore fluid and flowed in a generally axial direction through the wellbore (with reference to a central wellbore axis, regardless of wellbore orientation such as vertical, deviated, horizontal, etc.), such as wellbore 114, along a flowpath. The FCCSF may move within the wellbore via gravity, self-propulsion, buoyancy forces, circulating fluids in the wellbore, conveyance by tractor, robot, wireline, slickline or coiled tubing, or combinations thereof. The FCCSF may be flowed in a production fluid, a flowback fluid, a wellbore servicing fluid (e.g., a drilling fluid, a circulating fluid, completion fluid such as cement and/or spacer fluid, etc.), or combinations thereof. An operator or control system may control the flowing movement of the FCCSF by, for example, by circulating a fluid within or through the wellbore or a portion thereof.

Figure 3C:
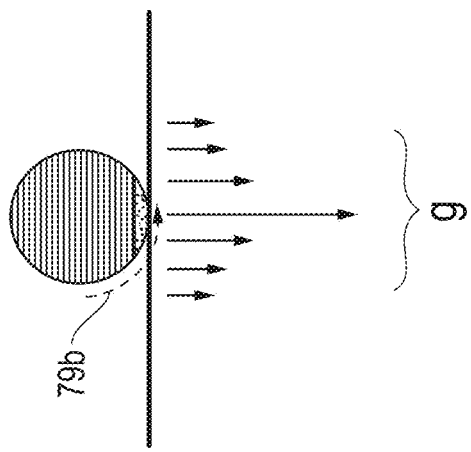
FIGS. 3A-3C represent a schematic drawing of a self-orienting frac ball according to an embodiment of the disclosure.
Figure 3B:
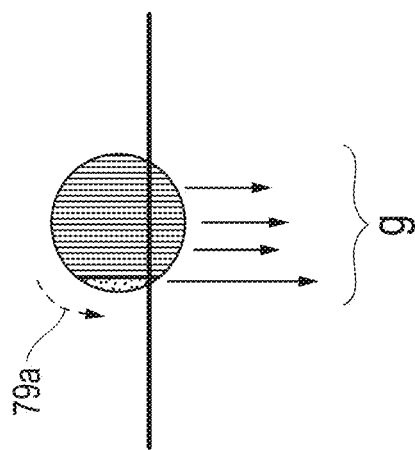
Figure 3A:
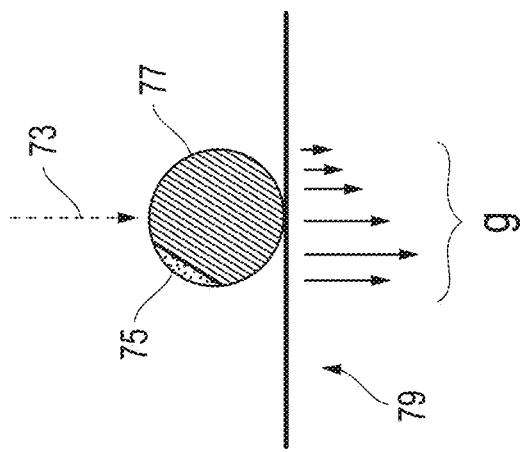

In some embodiments, the FCCSF may be a self-orienting FCCSF. For example, in such an embodiment, when immersed in a wellbore fluid, the self-orienting FCCSF may self-orient as the self-orienting FCCSF flows through the wellbore. Additionally or alternatively, the FCCSF may self-orient in place, for example adjacent a seat or baffle. In an embodiment, self-orientation of the FCCSF may be achieved, for example, by providing the FCCSF with a surface profile that offsets the center of mass from the geometric center of the FCCSF and/or by utilizing a FCCSF comprising a ballast. In an embodiment, the ballast may comprise a weight positioned within the FCCSF such that the center of mass of the FCCSF is offset from the geometric center of the FCCSF. In an embodiment, the ballast may comprise a functional component (e.g., electronic component, sensor, battery, etc.) positioned within the FCCSF such that the center of mass of the FCCSF is offset from the geometric center of the FCCSF. The material of the weight may be any suitably dense material, such as a metal, a ceramic, concrete, sand, and combinations thereof. In the embodiment, the ballast comprises tungsten. In an embodiment, the FCCSF is a self-orienting frac ball. FIGS. 3A-3C illustrate the self-orientation of a suitably configured frac ball 77 comprising a ballast 75 after being dropped 73 into a higher-density fluid 79 in accordance with an embodiment of the disclosure. The vertical arrows illustrate the effects of gravity (g) in rotating 79a, 79b the flowable component towards a state of minimum potential energy.

Figure 4D:
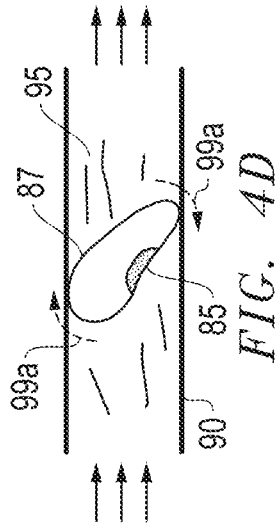
FIGS. 4A-4F represent a schematic drawing of a self-orienting frac ball according to an embodiment of the disclosure.
Figure 4E:
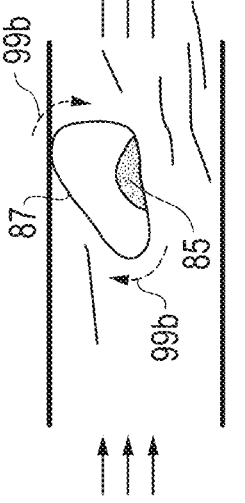
Figure 4F:
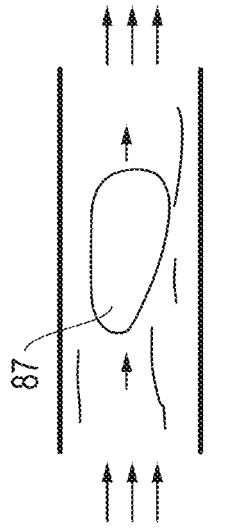
Figure 4A:
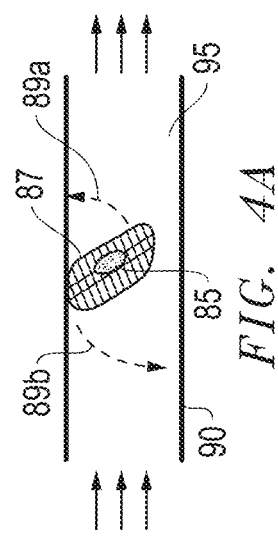
Figure 4B:
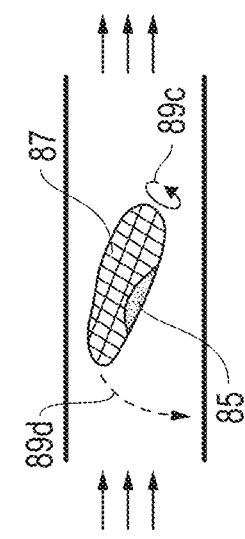
Figure 4C:
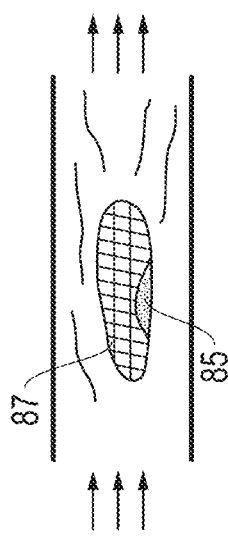

In an embodiment, a FCCSF may be configured such that the FCCSF self-aligns itself according to a pre-selected three-dimensional orientation when the FCCSF is submerged in fluid, for example, a fluid flowing at a different speed than the FCCSF. The tendency to self-orient may be imparted to the FCCSF by configuring the FCCSF to have a center of mass offset from the geometric center of the FCCSF (e.g., by the means discussed herein). Although not wishing to be bound by theory, it is believed that the tendency of a FCCSF to vertically self-align when buoyantly submerged in a fluid is due to the pull of gravity on the uneven center of mass of the FCCSF. Additionally or alternatively, in an embodiment, the tendency to horizontally self-orient may be imparted to the FCCSF by configuring the FCCSF to have a surface profile that favors a particular orientation when submerged in a moving fluid (e.g., flowing at a different speed than the FCCSF). Also not wishing to be bound by theory, it is believed that alignment of a FCCSF is caused by the cumulative effect of drag forces applied to the FCCSF. FIGS. 4A-4F illustrate the vertical alignment V and horizontal alignment H of a FCCSF 87 (particularly, FIGS. 4A-4C illustrate a side view and FIGS. 4D-4F illustrate an overhead view) having a ballast 85 configured to self-align according to a pre-selected three-dimensional orientation after being placed in a horizontal wellbore 90 through which a circulating fluid 95 flows at velocity $v_1$ in accordance with an embodiment of the disclosure. As illustrated by FIGS. 4A-4C, FCCSF 87 undergoes various rotations (e.g., illustrated as 89a, 89b, 89c, and/or 89d) in order to minimize the total drag forces acting on the surface 98 of FCCSF 87 by fluid 95 and to place FCCSF 87 in a state of minimum potential energy with respect to gravity. As illustrated by FIGS. 4D-4F, drag forces of fluid 95 on FCCSF 87 may drive rotations 99a and/or 99b such that FCCSF 87 is horizontally oriented such that the total drag forces on FCCSF 87 are minimized.

The method may progress to block 1400 wherein the FCCSF may be caused to interact with a downhole tool. The FCCSF may interact with a downhole tool by, for example, seating, engaging, mating, landing, moving, obturating, actuating upon, shifting, transmitting and/or receiving wireless signals, and combinations thereof with a counterpart/responsive/cooperative/complementary component of the downhole tool.

For example, in an embodiment of wellbore servicing method 1000, the FCCSF may be configured to obturate a flowpath or orifice of a downhole tool in furtherance of a wellbore servicing operation. In one such embodiment, a method of servicing a wellbore generally includes flowing an obturating FCCSF (OFCCSF) to a receiving member of a downhole tool, contacting the OFCCSF with the receiving member, forming a seal between the OFCCSF and the receiving member, for example, so as to obturate the flowpath or orifice of the downhole tool, and applying pressure (e.g., fluid pressure) to the OFCCSF, thus restricting the flow of fluid through the orifice and, for example, creating a differential pressure applied to the downhole tool or a component thereof. In various embodiments, the receiving member may comprise a seat disposed around an orifice, and the OFCCSF may sealingly engage the seat. Although references herein are generally made to a "seat" or "ball seat," it is to be understood that such references shall be to any structure or mechanical assemblage configured and effective for receiving, catching, stopping, or otherwise engaging an obturating member (e.g., an OFCCSF, such as a ball, plug, or dart). For example, the OFCCSF may comprise a baffle plate, an obturating member seat, a selectively expandable seat, an indexing check valve, or combinations thereof.

Figure 5A:
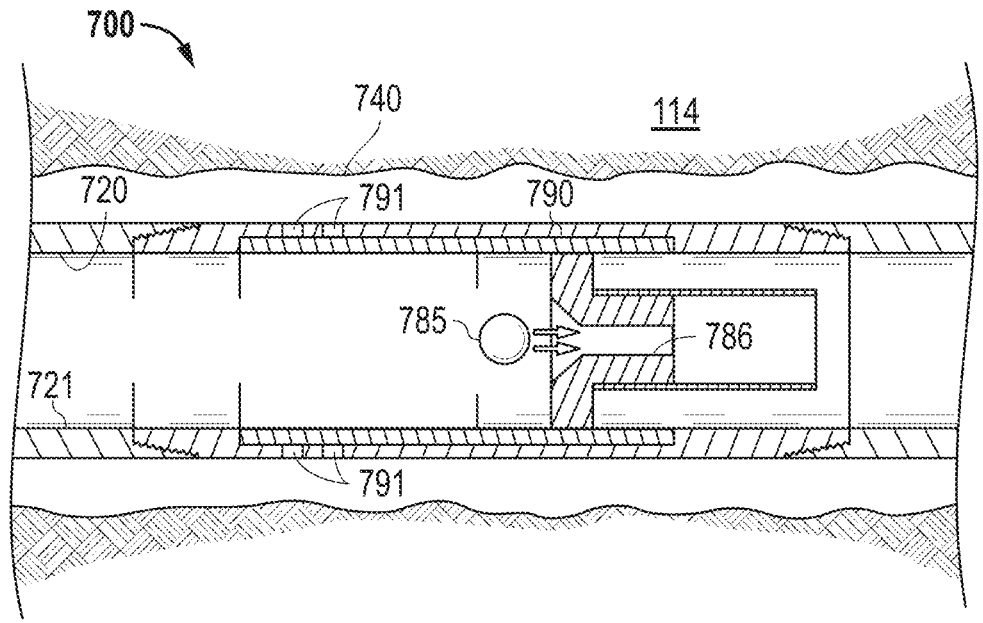
FIG. 5A is a schematic side view of an activatable stimulation assembly having a sliding sleeve and depicting an obturating member engaging a seat coupled to the sliding sleeve.
Figure 5B:
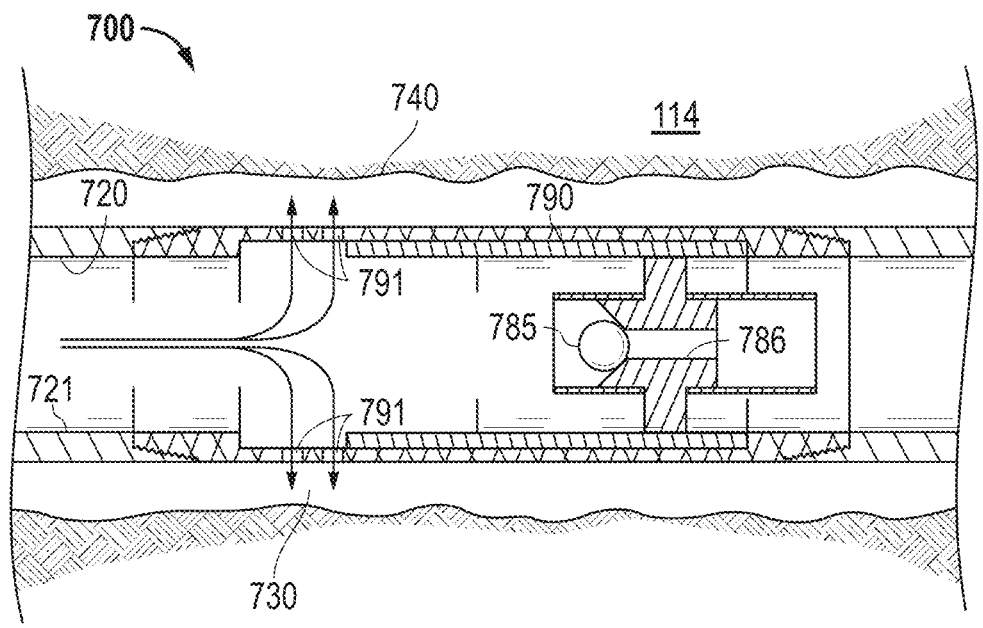
FIG. 5B is a schematic side view of the activatable stimulation assembly of FIG. 7A, wherein a force applied by an obturating member in accordance with an embodiment has moved the sliding sleeve such that ports of a work string casing of the activatable stimulation assembly have become unobstructed.

In various embodiments, application of pressure (e.g., fluid pressure to) the OFCCSF may be effective to actuate a movable downhole tool and/or a movable component of a downhole tool, such as a sliding sleeve disposed in a wellbore servicing tool or casing (wherein the OFCCSF engages a seat allowing an increase in pressure and resultant movement of a sliding sleeve, for example to open a window or port to fluid flow in the tool or casing) or an actuatable jetting or perforating tool (wherein the OFCCSF engages a seat to allow an increase in pressure to provide high pressure fluid flow/jetting through ports to induce perforations and/or fractures in the surrounding wellbore and formation). Referring to FIG. 5A, a side view of an activatable stimulation assembly 700 having a sliding sleeve 790 disposed in casing 720 and depicting an OFCCSF 785 engaging a seat 786 coupled to the sliding sleeve 790 is shown. In an embodiment, the OFCCSF 785 may be introduced into the axial flowbore 721 and pumped therethrough so as to engage the seat 786. Upon engaging the seat 786, the OFCCSF 785 may substantially restrict the flow of fluid through the sliding sleeve 790, such that pressure (e.g., fluid pressure) will increase against the OFCCSF 785 which will thus exert a force against the seat 786. As shown in FIG. 5B, exerting sufficient force against the seat 786 will cause the sliding sleeve 790 to move such that the ports or apertures 791 of the casing 720 become unobstructed by the sliding sleeve 790, thereby allowing fluid communication between axial flowbore 721 and the wellbore across casing 720 (as shown by flow arrows 730 and 740, respectively). In an embodiment, the actuatable assembly 700 shown in FIGS. 5A and 5B is further illustrated as tool 190 in FIG. 1 and positioned adjacent to zones 2, 4, 6, 8, 10, and 13, thereby providing selective access to one or more zones along a wellbore as part of a wellbore stimulation operation. The seat and OFCCSF (and optionally a sliding sleeve) arrangement and cooperative interaction may be employed in various wellbore servicing tools such as fracturing/jetting tools, valves, sampling devices, cement shoes, plugs, etc., and such may employ cooperative configurations/shapes other than a round ball and seat (e.g., dart/wiper and related landing).

In various embodiments, a FCCSF, for example, a self-orienting FCCSF, is configured to interact with a downhole tool in a particular (e.g., a self-oriented) position. In an embodiment, such a self-orienting FCCSF may comprise a surface profile configured to sealingly engage a receiving member of a downhole tool when in a self-oriented position. For example, a surface profile of a self-orienting FCCSF may complement a surface profile of a seat disposed within a flow path a receiving member such that fluid communication via the flow path is restricted when the surface profile of the self-orienting FCCSF and the surface profile of the seat are engaged with one another. For example, the FCCSF may comprise a spherical surface profile and the seat may comprise seat having an edge tapered at about the same angle as a line running tangent to a surface of the FCCSF. The self-orientation of the FCCSF may line up the surface profile of the FCCSF with a seat of the receiving member placed in a flowpath of the FCCSF such that the surface profile of the FCCSF and the surface profile of the seat may contact one another and form a seal.

Figure 6:
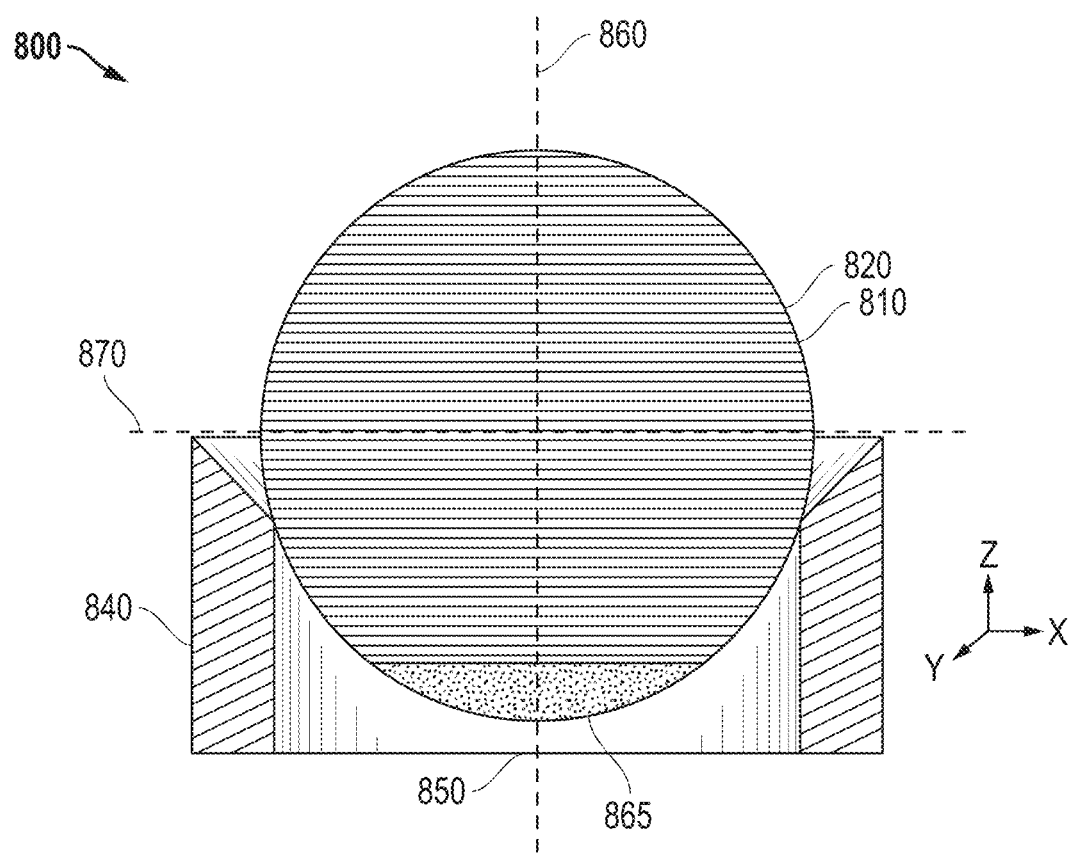
FIG. 6 is a schematic side view of a flowable component according to an embodiment of the disclosure.

In an embodiment, the self-orienting FCCSF is configured such that the FCCSF has a non-uniform strength profile. For example, the self-orienting FCCSF may be configured to have greater strength (e.g., greater crush resistance) along a first axis of orientation of the FCCSF in comparison to a second axis of orientation. In an embodiment, a self-orienting FCCSF configured to have greater strength along a given axis of orientation may be maintained in the pre-selected, desired orientation while a pressure differential is applied across the flowable component along the axis of orientation. Providing a self-orienting FCCSF having a non-uniform strength profile may advantageously allow the FCCSF to withstand greater differential pressures while having a lower densities and cost compared to FCCSF's having a uniform strength profile. In another example, an OFCCSF 800 may comprise a composite wherein layers of syntactic foam 810 are alternated with layers of another material 820, for example, as is shown in FIG. 6. In the embodiment of FIG. 6, the OFCCSF exhibits a non-uniform strength profile. For example, in the embodiment of FIG. 6, when OFCCSF 800 engages a seat 840 generally defining a flow path 850 such that axis 860 generally aligns with the flow path 850 (e.g., aligns with the center of the flow path 850), the OFCCSF 800 will be capable of withstanding greater differential pressures applied across the seal formed between OFCCSF 800 and seat 840 than if the OFCCSF were oriented such that another axis (e.g., axis 870) were aligned with the flow path 850. Such favorable orientation may be achieved, for example, via offset ballast 865, as disclosed herein. Another example of an FCCSF having a non-uniform strength profile is provided by, for example, forming a FCCSF from a syntactic foam, wherein the matrix material comprises fibers oriented in a particular direction.

Additionally or alternatively, in an various embodiment, interaction between a signaling FCCSF (SFCCSF) and a downhole tool may also be accomplished via signals (e.g., transmitted and/or received signals between a SFCCSF and the downhole tool or a component thereof), for example, in furtherance of a wellbore servicing operation. In an embodiment, the SFCCSF may send and/or receive signals to convey data (sense and/or log data) and/or to initiate a functionality of a wellbore tool located within a proximity of the SFCCSF. As an example, a SFCCSF may transmit data to one or more receivers as an input to a wellbore servicing control system. The data may include, for example, information about the position of the SFCCSF, information about local wellbore conditions (e.g., temperature, pressure, etc.), information about the status of other downhole tools, and the like. As another example, the SFCCSF may be flowed within a work string to a location proximate to wellbore servicing tool, whereupon the SFCCSF transmits a signal to a controller of the wellbore servicing tool initiating an actuation of component thereof (e.g., a sliding sleeve). Depending on the instruction, the sliding sleeve may establish or terminate fluid communication across a boundary of a work string by exposing or obstructing one or more ports providing a route of fluid communication to/from the subterranean formation.

The SFCCSF may be configured to emit or broadcast one or more signals. Suitable signals include, but are not limited to, a wireless signal, electric signal, electronic signal, acoustic signal, a magnetic signal, an electromagnectic signal, a chemical signal, a radioactivity signal, or combinations thereof. The SFCCSF generally comprises any suitable device capable of sending, emitting, or returning a signal capable of being received by a signal receiver disposed within the wellbore. For example, in an embodiment, the SFCCSF comprises a signaling device, such as a transceiver configured to send and/or receive a wireless signal. Suitable wireless signals include but are not limited to a radio frequency, an RFID signal, an NFC signal, a magnetic field, an acoustic signal, or combinations thereof. In an embodiment, the transceiver is configured to transmit a wireless signal unique to the transceiver. The unique signal may be used by a receiver to distinguish and/or authenticate signals transmitted from the SFCSSF. In an embodiment, the SFCCSF comprises material (e.g., composition of the syntactic foam) that does not interfere with transmission and/or receipt of such signals.

In various embodiments, the SFCCSF may generally be characterized as an active signaling device, for example, a device capable of actively emitting a given signal. Alternatively, the SFCCSF may generally be characterized as a passive signaling device, for example, a device that, by its presence, allows/causes a signal to be evoked. For example, a suitable SFCCSF may include, but is not limited to the inclusion of, radio-frequency identification (RFID) tags, radio transmitters, microelectromechanical systems (MEMS), a magnetic device, acoustic signal transmitting devices, radiation and/or radioactivity-emitters, magnetic or electromagnetic emitters, the like or combinations thereof. Alternatively or additionally, the SFCCSF may comprise an interrogation unit, a communication unit, or combinations thereof.

In various embodiments, the SFCCSF may be configured suitably for communication within a wellbore. For example, in an embodiment, a SFCCSF may be configured as and/or comprise a ball, a dart, or the like, for example, such that the SFCCSF may be conveyed (e.g., pumped) through the wellbore to proximity with a given wellbore servicing tool for the purpose of transmitting data and/or instructions to a receiver of the wellbore servicing tool. In an embodiment, the SFCCSF is configured to signal a downhole signal receiver upon coming with a desired range of the receiver (e.g., within about 1 inches, alternatively, within about 1 foot, alternatively, within about 5 feet, alternatively, within about 10 feet, alternatively, within about 20 feet).

In an embodiment, the FCCSF (e.g., the SFCCSF) may comprise a power source to power a signaling device of the SFCCSF. The power source may be any suitable portable power source, such as a battery, a piezoelectric device configured to generate electrical currents from externally applied stresses encountered by the SFCCSF in the wellbore, a fuel cell, a thermoelectric generator, a Galvanic Cell, and combinations thereof. In an embodiment, such power source is positioned (e.g., offset) within the SFCCSF so as to provide a desired orientation and/or a flow characteristic such as those disclosed herein.

In various embodiments, a magnetic FCCSF (MFCCSF) may be configured to emit a magnetic signal. In such an embodiment, the magnetic signal may further interact with a component in the wellbore (for example, to control or actuate, e.g., open or close, a tool as described herein). In some embodiments, a MFCCSF may contain a ferrofluid, magnetorheological fluid, or any other fluid having magnetic properties which can be sensed by a downhole sensor as the MFCCSF approaches and/or passes by the downhole sensor. In some embodiments, the MFCCSF comprises a magnetic transceiver configured to send and/or receive magnetic signals. In an embodiment, the MFCCSF comprises a known magnetic signature and a downhole sensor is configured to perform an act in furtherance of a wellbore servicing operation upon detection of the known magnetic signature. The magnetic signature may comprise, for example, known magnetic properties, and/or a known magnetic field, or a pattern or combination of magnetic fields, capable of being detected and, optionally, distinguished by the downhole sensor (e.g., a magnetic sensor).

Figure 7A:
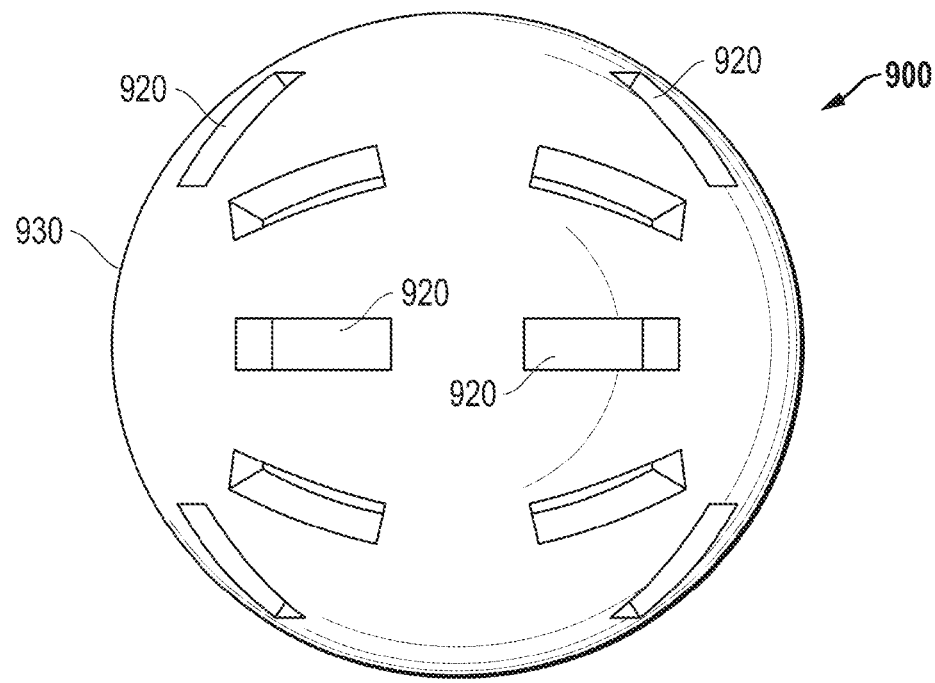
FIGS. 7A and 7B are representative top and side views, respectively, of a magnetic flowable component according to an embodiment of the disclosure.
Figure 7B:
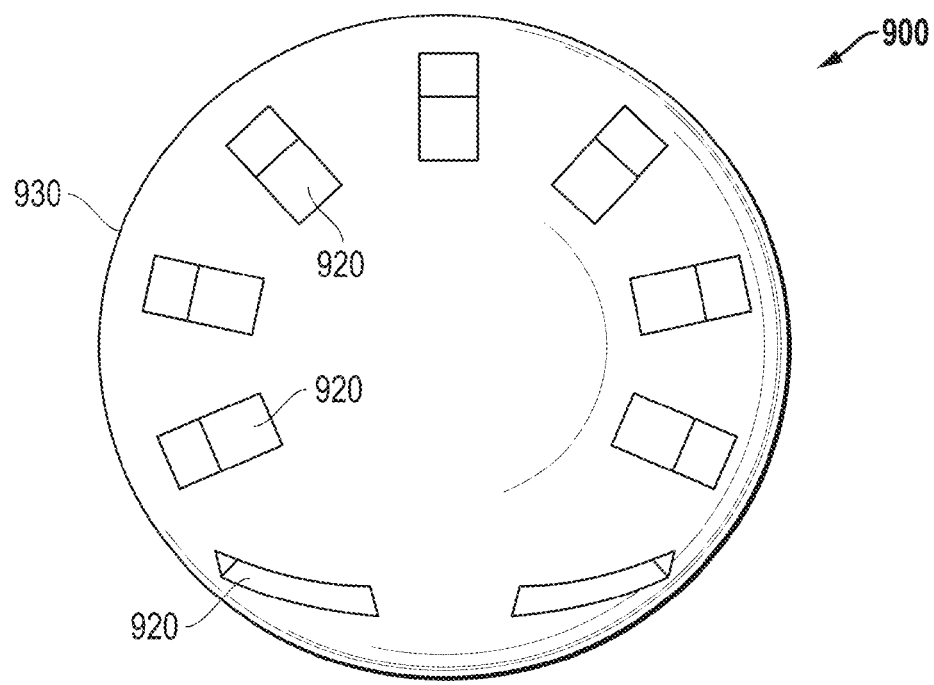

Referring now to FIGS. 7A and 7B, an embodiment of the MFCCSF 900 is representatively illustrated. In this embodiment, magnets are retained in recesses 920 formed in an outer surface of a sphere 930. In the embodiment of FIGS. 7A and 7B, the recesses 920 are arranged in a pattern which, in this case, resembles that of stitching on a baseball. In the embodiment of FIGS. 7A and 7B, the pattern comprises spaced apart positions distributed along a continuous undulating path about the sphere 930. However, it should be clearly understood that any suitable pattern, alternatively, a random arrangement, of magnetic field-producing components may be used in an MFCCSF 900, in keeping with the scope of this disclosure. The magnets are preferably arranged to provide a magnetic field a substantial distance from the device 900, and to do so no matter the orientation of the sphere 930. The pattern depicted in FIGS. 7A and 7B desirably projects the produced magnetic field(s) substantially evenly around the sphere 930.

In an embodiment, the magnetic field or pattern emitted by the MFCCSF (alternatively, by a plurality of MFCCSFs) may comprise a predetermined magnetic field/pattern (such as, the pattern of magnetic field-producing components on the MFCCSF 900 of FIGS. 7A and 7B, etc.), a predetermined pattern of multiple magnetic fields (such as, a pattern produced by displacing multiple MFCCSFs 900 in a certain manner through the well, etc.), a predetermined change in a magnetic field (such as, a change produced by displacing a metallic device past or to a downhole sensor), and/or a predetermined pattern of multiple magnetic field changes (such as, a pattern produced by displacing multiple metallic devices in a certain manner past or to a downhole sensor, etc.). Any manner of producing a MFCCSF pattern may be used, within the scope of this disclosure.

In an embodiment, the magnetic components of the MFCSSF may be partially or completely encapsulated by syntactic foam. In various embodiments, the syntactic foam of the MFCSSF comprises materials (e.g., matrix material and microspheres) that are impermeable or substantially impermeable to magnetic fields. Not intending to be bound by theory, utilizing a magnetically impermeable material may advantageously allow magnetic fields emitted by the magnetic components comprising the MFCCSF to pass through the syntactic foam surrounding the magnetic components substantially unhindered, for example, allowing for improved detection of the magnetic fields by external sensors in proximity to the MFCSSF.

In an embodiment, the MFCCSF 900 may generally comprise a permanent magnet, a direct current (DC) magnet, an electromagnet, or combinations thereof. In an embodiment, the MFCCSF 900 or a portion thereof may be made of a ferromagnetic material, such as, iron, cobalt, nickel, steel, rare-earth metal alloys, ceramic magnets, nickel-iron alloys, rare-earth magnets, other known materials such as Co-netic AA®, Mumetal®, Hipernon®, Hy-Mu-80®, Permalloy®, any other suitable material as would be appreciated by one of ordinary skill in the art upon viewing this disclosure, or combinations thereof. For example, in an embodiment, the MFCCSF 900 may comprise a magnet, for example, a ceramic magnet or a rare-earth magnet. In such an embodiment, the MFCCSF 900 may comprise a surface having a magnetic north-pole polarity and a surface having magnetic south-pole polarity and may be configured to generate a magnetic field, for example, the magnetic signal.

In an additional or alternative embodiment, the MFCCSF 900 may further comprise an electromagnet comprising an electronic circuit comprising a current or power source, an insulated electrical coil, a ferromagnetic core, and/or any other suitable electrical or magnetic components as would be appreciated by one of ordinary skill in the arts upon viewing this disclosure, or combinations thereof. In an embodiment, the electromagnet may be configured to provide an adjustable and/or variable magnetic polarity. Additionally, application of a direct current (DC) to the electric coil may form a magnetic field of constant polarity and reversal of the direction of the current flow may reverse the magnetic polarity of the magnetic field. In an embodiment, the MFCCSF 900 may comprise an insulated electrical coil electrically connected to an electronic circuit (e.g., via a current source), thereby forming an electromagnet or a DC magnet. In an additional embodiment, the electronic circuit may be configured to provide an alternating and/or a varying current, for example, for the purpose of providing an alternating and/or varying magnetic field. In such an embodiment, the electronic circuit may be configured to generate a pulsed magnetic signal such as a magnetic signal comprising a modulated digital signal, a data packet, an analog waveform; and/or any suitable magnetic pulse signature as would be appreciated by one of ordinary skill in the art upon viewing this disclosure. Additionally, in such an embodiment, a metal core may be disposed within the electrical coil, thereby increasing the magnetic flux (e.g., magnetic field) of the electromagnet. In an embodiment, one or more components associated with producing a magnetic field are positioned (e.g., offset) within the MFCCSF so as to provide a desired orientation and/or flow characteristic such as those disclosed herein.

In various embodiments, a plugging FCCSF (PFCCSF) may interact with a downhole tool by plugging the downhole tool and/or working in conjunction with a downhole tool to plug a downhole flowpath. The PFCCSF may be a wiper plug, a cementing plug, a frac plug, or any other plug useful for a wellbore servicing operation. The PFCCSF may be partially or completely comprised of syntactic foam. In an embodiment, the PFCCSF interacts with a seat or landing assemblage, such as shown in FIGS. 5A, 5B, and 6.

In an embodiment, the PFCCSF may comprise one or more drillable portions that allow fluid communication across the PFCCSF when removed (e.g., drilled out). In various embodiments, one or more drillable portions of the PFCCSF may comprise syntactic foam. For example, the drillable portion(s) comprising syntactic foam may be disposed in a solid or rigid frame and/or member of the PFCCSF. In an embodiment, a drillable core of the PFCCSF comprises syntactic foam. Not intending to be bound by theory, utilizing syntactic foams for at least the drillable portions of the PFCCSF, the risk that drilled pieces may obstruct the fluid flow through the drilled portion may be reduced and/or the probability of recovering the drilled portions may be increased. Although not wishing to be bound by theory, it is believed that a buoyant force of the drilled portions caused by the relatively low density of the syntactic foam (e.g., low density relative to surrounding wellbore fluids) allows trapped pieces of the drilled material to escape. The buoyancy of the drilled pieces may also allow pieces of the drilled material to rise through the wellbore to the surface, thus facilitating recovery of the drilled pieces.

Figure 8:
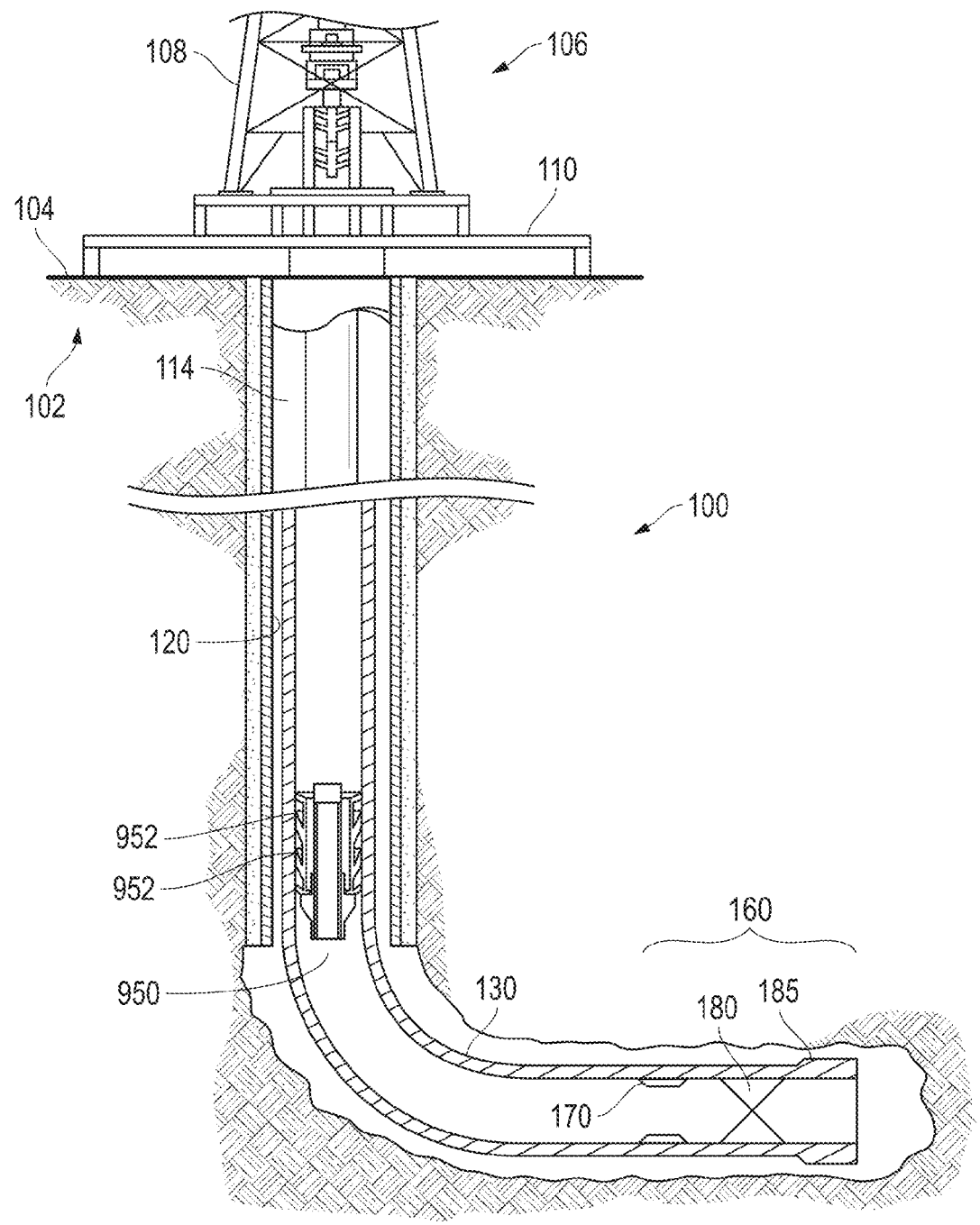
FIG. 8 is a simplified cutaway view of an operating environment in which an flowable component comprising a cementing or wiper plug according to an embodiment of the instant disclosure may be employed.

In an embodiment, the PFCCSF is a cement or wiper plug, such as shown in FIG. 8. For example, a cement or wiper plug may have a body portion, or a portion thereof, made from syntactic foam and one or more flexible wiper portions extending outward to contact the interior surface of the wellbore (e.g., a casing string or liner) while being flowed therethrough. For example, in the embodiment of FIG. 8, a first PFCCSF 950 may be flowed downward through a casing string 130 (alternatively, a liner) disposed within a wellbore (e.g., within another casing string 120) during a cementing operation. In the embodiment of FIG. 8, the first PFCCSF 950 is flowed downwardly through the casing string followed immediately by a cementitious slurry. The first PFCCSF 950 comprises one or more wipers (e.g., fins) which sealingly engage the inner walls of the casing string 130, thereby prohibiting any intermingling between the cementitious slurry and any other fluid which may been previously disposed within the wellbore.

In an embodiment, the first PFCCSF 950 is flowed downwardly through the casing string 130 until the first PFCCSF reaches and engages a cementing assembly 160. The cementing assembly 160 may generally comprise a collar 170, for example, comprising a seat or chamfer generally sized and/or configured to engage the first PFCCSF 950, a valve 180 (e.g., a float valve, check valve, etc.), a shoe 185, (e.g., a guide show or float shoe), or combinations thereof. Upon engaging the cementing assembly 160, the cementing assembly 160 may allow the cementitious slurry to flow out of the flowbore of the casing string 130 and into an annular space surrounding the casing string, where the cementitious slurry may be allowed to set.

In an additional embodiment, a second PFCCSF comprising a second cementing plug may be flowed downwardly through the casing string 130 behind the cementitious slurry (e.g., behind a predetermined volume of the cementitious slurry). In such an embodiment, the second PFCCSF may be flowed through the casing string 130 until reaching the first PFCCSF 950, thereby ensuring that the cementitious slurry is not intermingled with any additional fluid utilized to force the cementitous slurry into the annular space surrounding the casing string 130.

Although various examples of wellbore servicing operations utilizing an FCCSF, for example, in which the FCCSF interacts with a downhole tool, have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples, as may be suitable. One example's features are not mutually exclusive to another example's features. Instead, the scope of this disclosure encompasses any combination of any of the features. Further, although each example described above includes a certain combination of features, it should be understood that it is not necessary for all features of an example to be used. Instead, any of the features described above can be used, without any other particular feature or features also being used.

Referring again to FIG. 2, the method may progress to block 1500 wherein the FCCSF may be removed and/or recovered from the wellbore. In an embodiment, removal and/or recovery of the FCCSF from the wellbore may be accomplished by reverse-circulating a fluid such that the FCCSF disengages the seat, returns to the surface, and is removed from the axial flowbore of the first tubing member; by allowing the FCCSF to rise to the surface via buoyancy; by carrying the FCCSF out of the wellbore with a formation fluid; by allowing the FCCSF or a portion thereof to be reduced; or combinations thereof. For examples, reverse-circulating a fluid may open or otherwise provide a high-volume flowpath out of the end of the end of the sliding sleeve and/or associated tool (e.g., the lower or downhole end of a tool such as a jetting/perforating tool or other completion tool) as such an opening may be provided to allow the reverse-flowing of fluid. In an alternative embodiment, removal of the FCCSF may be accomplished by increasing the pressure against the FCCSF such that the FCCSF is disintegrated or is forced beyond or through the seat, which also may open or otherwise provide a high-volume flowpath through the tool/assembly. Still other embodiments concerning removal of the FCCSF may comprise drilling through the FCCSF to remove the FCCSF or employing a reducible (e.g., dissolvable and/or degradable) FCCSF designed to dissolve/disintegrate due to the passage of a set amount of time or due to designated changes in the FCCSF's environment (e.g., changes in pressure, temperature, or other wellbore conditions). In an embodiment, an accelerant, activator, degradant, or the like may be applied to and/or contacted with a FCCSF comprising a reducible material, for example application of acid to an acid-soluble FCCSF, water to a water-soluble FCCSF, hydrocarbon to a hydrocarbon-soluble, FCCSF, etc. In an embodiment, removal of the FCCSF will allow the flow of fluids through the axial flowbore of the first tubing member to be reestablished (e.g., a high-volume flowpath). In an embodiment, removing the FCCSF may cause no change in the position of the ports or apertures in an associated assembly (e.g., fracturing tool/assembly). In an alternative embodiment, removing the FCCSF may cause some or all of the ports or apertures to be shifted open (e.g., via a sliding sleeve or other manipulatable door or window; alternatively, via movement of a biased member or sleeve). In still another embodiment, removing the FCCSF may cause some or all of the ports or apertures to be shifted closed.

In an embodiment where the FCCSF is recovered from the wellbore, recovery of the FCCSF may be facilitated by actions of a wellsite operator and/or a computerized wellbore servicing control system or module to further recovery of the FCCSF; by self-recovery of the FCCSF (e.g. rising out of the wellbore via buoyant properties of the FCCSF); by the occurrence of natural phenomena; as an indirect and/or secondary consequence of one or more wellbore servicing operations; or any combination thereof. A non-limiting example of a physical property of the FCCSF that may aid recovery of the FCCSF is the specific gravity of the syntactic foam, which may be lower than the wellbore fluid wherein the FCCSF is submerged. The relatively low specific gravity (relative density, with respect to the fluids present within the wellbore) may advantageously allow the FCCSF to rise to the surface and/or to different part of the wellbore via a buoyancy force. For an FCCSF comprising one or more of reducible materials, the degradable and/or consumable nature of the FCCSF (or a portion of the FCCSF), may advantageously allow a trapped FCCSF to undergo a size reduction, thereby allowing the FCCSF to break free and rise to the surface via the buoyancy force provided by the lower density of the syntactic foam. Additionally or alternatively, the FCCSF may break apart into several different pieces, which may then float to the surface via the buoyancy force of the syntactic foam and individually recovered. Examples of suitable actions a wellbore operator and/or a computerized wellbore servicing control system or module may take to facilitate recovery of the FCCSF include, but are not limited to, reverse circulating a wellbore fluid, introducing higher density fluid into the wellbore to increase a buoyancy force on the FCCSF, terminating a pressure gradient applied across a FCCSF to seal an orifice or isolate a region of the wellbore, and combinations thereof.

In cases where the FCCSF is trapped or confined to a region of the wellbore, a wellsite operator and/or a computerized wellbore servicing control system or module may directly or indirectly create conditions in the wellbore that will initiate or hasten deterioration of a reducible material contained within the FCCSF, thereby facilitating a size reduction of the FCCSF that may free the FCCSF. Examples of wellbore servicing operations that may be utilized to indirectly facilitate recovery of the FCCSF include stimulation of the wellbore (produced and/or flowback fluids may carry the FCCSF to the surface); applying a wellbore treatment that may also deteriorate a reducible component contained within the FCCSF (e.g., applying an accelerant, activator, catalyst, degradant, etc.); sealing a lost circulation zone (increased circulation facilitates removal of the FCCSF); and combinations thereof.

As previously described herein, a problem that may be encountered when using such an FCCSF is that the FCCSF may become stuck (in the valve seat, for example) or confined to a particular region of the wellbore, either of which may impede completion of the wellbore and/or various other wellbore operations. In such cases, it may be desirable break apart all or a portion of the FCCSF in order for pieces of the FCCSF to be recovered and/or removed to another part of the wellbore. In other cases, it may be desirable to completely consume and/or cause deterioration of the FCCSF. Thus, it may be desirable to utilize a FCCSF comprising one or more reducible materials, such as the reducible materials disclosed herein. In the event the FCCSF is undesirably confined within the wellbore, the likelihood of recovering, relocating, and/or consuming the FCCSF may be improved because wellsite operators may be able to directly or indirectly create wellbore conditions capable of initiating and/or hastening deterioration of one or more of the reducible materials. For example, deterioration of an undesirably confined FCCSF comprising an oil-soluble material could be initiated or hastened by introducing an oleaginous fluid into the wellbore to dissolve the oil-soluble material of the FCCSF. As another example, an acid-sensitive FCCSF undesirably confined within a wellbore could be deteriorated and/or broken apart by increasing the acidity of the wellbore environment. Additionally or alternatively, it may be desirable to apply a load (e.g., hydrostatic load and/or physical load via contact) to a FCCSF, and in particular a FCCSF comprising a frangible or breakable component (e.g., ceramic coating, etc.).

In an additional or alternative embodiment, for example, in an embodiment where a FCCSF comprises a cementing plug, as an alternative to recovering the FCCSF, the FCCSF (e.g., the PFCCSF 950, as disclosed herein) may be removed. For example, in such an embodiment, the PFCCSF may be drilled out following the completion of the cementing operation.

Disclosed herein are methods, systems, and apparatuses utilizing FCCSF's alone or in combination with one or more downhole tools, also disclosed herein are downhole tools containing components comprising syntactic foam freely disposed therein.

In various embodiments, a valve may utilize an obturating member comprising syntactic foam and deployed downhole in furtherance of a wellbore servicing activity. The valve may function as a check valve, for example, wherein the obturating member restricts fluid flow through the valve by obturating an orifice. In an embodiment, the valve comprises a housing, which defines an outer boundary of a chamber of the valve; first and second orifices, each orifice providing fluid communication between the chamber and an environment external to the housing; and an obturating member comprising syntactic foam and configured to obturate at least one of the first and a second orifices. The obturating member may have a profile configured to sealingly engage the first orifice, a seat disposed around the first orifice, the second orifice, a seat disposed around the second orifice, or any combination thereof. For example, the obturating member may be a ball and the orifice be a circular opening having a tapered lip wherein the ball may sit. By sealingly engaging one of the orifices the valve may restrict the flow of fluid therethrough. The valve may have more than two orifices.

EXAMPLES

The invention having been generally described, the following examples are given as particular embodiments of the invention and to demonstrate the practice and advantages thereof. It is understood that the examples are given by way of illustration and are not intended to limit the specification.

Example 1

Figure 10A:
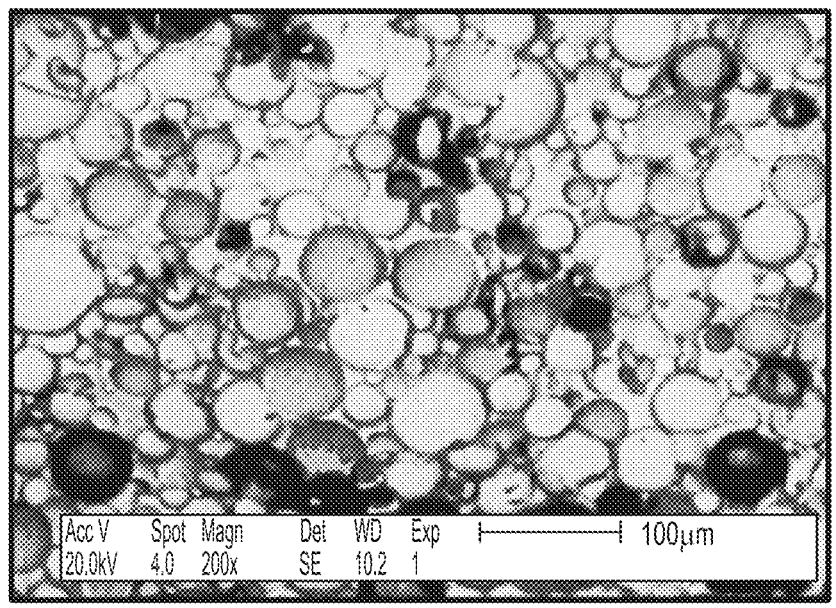
FIG. 10A is a micrograph showing the microstructure of a syntactic foam having glass bubbles dispersed within a matrix material absent exposure to hydrofluoric acid.
Figure 10B:
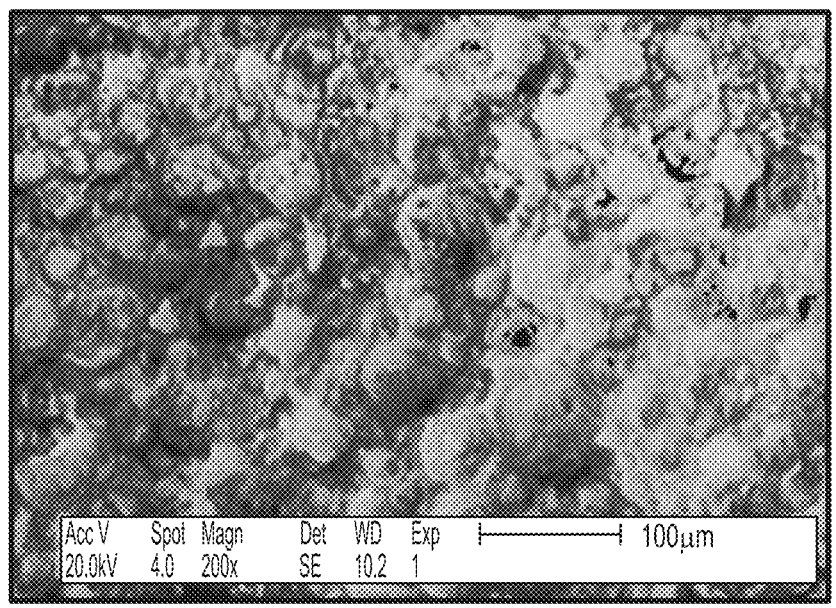
FIG. 10B is a micrograph showing the microstructure of a syntactic foam having glass bubbles after exposure to hydrofluoric acid.

The ability of the syntactic foam to withstand crush pressures up to 40,000 psi and pressure differentials up to 25,000 psi was investigated. A syntactic foam comprising glass bubbles set in an epoxy matrix material was obtained from CMT Materials of Attleboro, Mass. in the form of 1"×1"×6" blocks. The blocks were then machined into the shape of a ball to obtain a sample for measuring properties of the material.
Testing Apparatus The sample ball was tested using a pressure test fixture rated up to 40,000 psi, a test chamber, a pressure media (water), and a data acquisition system. The test fixture contained a tapered orifice at the bottom for forming a seal with a sample ball such that differential pressures could be applied across the sample ball. The fixture was pressurized with water, which allowed for a visible leak if present.
Testing Procedure Before pressure testing, the sample ball was dropped into a cup of water to ensure it floated and measurements were taken around the sample ball using digital calipers. The sample ball was then placed into the pressure test fixture. The pressure test fixture was subsequently brought into the test chamber and connected to a water line. After closing the test chamber door, the data acquisition was started and the fixture was pressurized to 40,000 psi. The pressure was maintained at 40,000 psi for about 5 minutes and then released to 0 psi. Leaving the bottom side of the pressure fixture open, the pressure was increased again, forcing the ball to seat on and form a seal with the tapered orifice. The pressure was increased until a pressure differential of 15,000 psi was applied across the sample ball. The 15,000 psi pressure differential was maintained for about 2 minutes and then increased to 25,000 psi. The 25,000 psi pressure differential was held for about 3 minutes and then released. The data acquired from pressure monitoring can be seen in the graph of FIG. 10. The pressure tests were done at ambient (room temperature). No significant leaks were detected in this process. After removing the sample ball from the pressure test fixture, the sample ball was placed in a cup of water to verify that the sample ball still floated. Another set of measurements were then taken using the same calipers. Measurements of the diameter of the test ball taken before and after the pressure testing are shown in Table 2.

TABLE 2

Diameter Measurements

| Measurement No. | Diameters Measured in Inches | |
|---|---|---|
| | Before Pressure Test | After Pressure Test |
| 1 | 0.8730 | 0.8740 |
| 2 | 0.8740 | 0.8730 |
| 3 | 0.8735 | 0.8740 |
| 4 | 0.8740 | 0.8735 |
| Average | 0.8736 | 0.8736 |

Although some scoring was present on the sample ball, no change in the average diameter of the sample ball was found and the sample ball still floated, indicating that the applied pressures did not reduce the density of the syntactic foam material and that the sample ball withstood compressive loads of 40,000 psi and pressure differentials of 15,000 psi and 25,000 psi.

Examples 2-5

The suitability of various raw matrix materials and syntactic foams for use in the apparatuses and systems disclosed herein was investigated by testing compatibility of the materials with various harsh substances commonly encountered in the wellbore environment. In particular, the effect of exposure of oleaginous and acidic testing fluids on the specific gravity of resin-based syntactic foams and raw resinous matrix materials was investigated. The testing fluids included crude oil and solutions of hydrochloric acid, (HCL), acetic acid with formic acid (HCOOH+CH$_3$COO), and hydrochloric acid with hydrofluoric acid (HCL+HF).

Samples (i.e., both the syntactic foam and raw matrix material samples) were tested for chemical compatibility in the following manner. A sample was placed inside an autoclave filled with the test fluid. The autoclave was then sealed and placed inside an oven at a temperature of 275° F. for 16 hours (except where stated otherwise). The specific gravity of each sample was measured before and after each test. This procedure was repeated for each material and each test fluid. The testing fluids included a 15 wt. % solution of hydrochloric acid, ("15% HCL"); a 50:50 mixture of 10 wt. % acetic acid solution and 10 wt. % formic acid solution, ("10% HCOOH+10% CH$_3$COO"); a solution containing 12 wt. % hydrochloric acid and 3 wt % hydrofluoric acid, ("12% HCL+3% HF"); and crude oil.

Example 2

Sample syntactic foam balls fabricated from an epoxy matrix material compounded with glass bubbles were developed for testing. The sample epoxy-glass balls were tested for compatibility with each of the testing fluids and the results are shown in Table 3.

TABLE 3

Chemical Compatibility of Epoxy-Glass Syntactic Foam Balls

| Material Description | Test Fluid | Temp | Test Time (hr) | Mass in Air (g) | Mass in IPA (g) | SG | Percent Change SG |
|---|---|---|---|---|---|---|---|
| Epoxy-Glass | 15% HCL | | 0 | 0.384 | 0.236 | 0.741 | 0.00% |
| | | 70 F. | 16 | 0.610 | 0.238 | 0.741 | |
| Epoxy-Glass | 10% HCOOH + 10% CH$_3$COOH | | 0 | 0.533 | 0.208 | 0.735 | 23.95% |
| | | 70 F. | 16 | 0.538 | 0.21 | 0.911 | |
| Epoxy-Glass | 12% HCl + 3% HF | | 0 | 0.631 | 0.245 | 0.765 | 39.35% |
| | | 70 F. | 16 | 0.634 | 0.247 | 1.066 | |
| Epoxy-Glass | Crude Oil | | 0 | .539 | 0.207 | 0.669 | 39.91% |
| | | 70 F. | 96 | 0.539 | 0.207 | 0.936 | |

The data in Table 3 indicates that the hydrochloric acid had no effect on the specific gravity while the other testing fluids increased the specific gravities of the test samples by at least about 24%.

Example 3

Samples of an amorphous thermoplastic matrix were tested for compatibility with each of the testing fluids and the results are shown in Table 4.

TABLE 4

Chemical Compatibility of Amorphous Thermoplastic

| Material Description | Test Fluid | Temp | Test Time (hr) | Mass in Air (g) | Mass in IPA (g) | SG | Percent Change SG |
|---|---|---|---|---|---|---|---|
| Thermoplastic | 15% HCL | | 0 | 0.607 | 0.236 | 1.286 | 0.22% |
| | | 275 F. | 16 | 0.610 | 0.238 | 1.289 | |
| Thermoplastic | 10% HCOOH + 10% CH$_3$COOH | | 0 | 0.533 | 0.208 | 1.289 | 0.01% |
| | | 275 F. | 16 | 0.538 | 0.21 | 1.289 | |
| Thermoplastic | 12% HCl + 3% HF | | 0 | | | 1.285 | 0.22% |
| | | 275 F. | 16 | | | 1.288 | |
| Thermoplastic | Crude Oil | | 0 | 0.539 | 0.207 | 1.276 | 0.00% |
| | | 275 F. | 72 | | | 1.276 | |

From Table 4, it can be seen that the amorphous thermoplastic sample exposed to crude oil experienced no increase in specific gravity, even after 72 hours of exposure. Table 4 also shows that amorphous thermoplastic samples individually exposed to the three acid solutions each experienced increases in specific gravity of less than 1%.

Example 4

An engineered thermoplastic material was compounded with the glass bubbles to provide an engineered thermoplastic syntactic foam. The engineered thermoplastic syntactic foam material was then formed into sample balls having diameters of 6 mm and specific gravities of 0.93 (SG<1.0) and 1.03 (1.0<SG<1.1) via injection molding. The engineered thermoplastic syntactic foam sample balls were tested for chemical compatibility in the as-molded state, and the results are presented in Table 5 below.

TABLE 5

Chemical Compatibility of Engineered Thermoplastic Syntactic Foam Balls

| Material Description | Test Fluid | Temp | Test Time (hr) | Mass in Air (g) | Mass in IPA (g) | SG | Percent Change SG |
|---|---|---|---|---|---|---|---|
| Engineered Thermoplstic Syntactic Foam Ball (SG < 1.0) | 15% HCL | 275 F. | 0 | 0.12 | 0.018 | 0.925 | 6.25% |
| | | | 16 | 0.125 | 0.025 | 0.983 | |
| Ball (SG < 1.0) | 10% HCOOH + 10% CH$_3$COOH | 275 F. | 0 | 0.124 | 0.023 | 0.965 | 1.03% |
| | | | 16 | 0.129 | 0.025 | 0.975 | |
| Ball (SG < 1.0) | 12% HCl + 3% HF | 275 F. | 0 | 0.125 | 0.021 | 0.945 | 16.48% |
| | | | 16 | 0.147 | 0.042 | 1.100 | |

TABLE 5-continued

Chemical Compatibility of Engineered Thermoplastic Syntactic Foam Balls

| Material Description | Test Fluid | Temp | Test Time (hr) | Mass in Air (g) | Mass in IPA (g) | SG | Percent Change SG |
|---|---|---|---|---|---|---|---|
| Ball (SG < 1.0) | Crude Oil | 275 F. | 0 | 0.125 | 0.02 | 0.936 | 2.94% |
| | | | 16 | 0.125 | 0.023 | 0.963 | |
| Ball (1.0 < SG < 1.1) | 15% HCL | 275 F. | 0 | 0.139 | 0.039 | 1.093 | 1.28% |
| | | | 16 | 0.145 | 0.042 | 1.107 | |
| Ball (1.0 < SG < 1.1) | 10% HCOOH + 10% $CH_3COOH$ | 275 F. | 0 | 0.14 | 0.039 | 1.090 | 1.97% |
| | | | 16 | 0.147 | 0.043 | 1.111 | |
| Ball (1.0 < SG < 1.1) | 12% HCl + 3% HF | 275 F. | 0 | 0.139 | 0.037 | 1.071 | 6.15% |
| | | | 16 | 0.149 | 0.046 | 1.137 | |
| PPS-Glass Ball (1.0 < SG < 1.1) | Crude Oil | 275 F. | 0 | 0.141 | 0.04 | 1.097 | 5.01% |
| | | | 16 | 0.151 | 0.048 | 1.152 | |

The results presented in Table 5 show that engineered thermoplastic-glass sample balls of both densities experienced an increase in specific gravity of less than 2% upon exposure to the organic acid solution (HCOOH+$CH_3$OOH) under the testing conditions. The denser engineered thermoplastic-glass sample ball test for compatibility with the HCl solution also experienced an increase in density of less than 2%, and the specific gravity of the less dense engineered thermoplastic-glass sample ball increased less than 2.94% upon exposure to the crude oil.

Example 5

Phenolic resins were blended with glass microspheres to produce phenolic-glass syntactic foams having different densities. Sample phenolic-glass balls having diameters of 6 mm and specific gravities of 0.8 and 1.0, respectively, were fabricated. Sample phenolic-glass balls of each density were tested for compatibility with each of the testing fluids, and the results are shown in Table 6.

As indicated by Table 6, the specific gravity of the G-1 and the F-1 sample phenolic-glass balls changed less than 4% after exposure to all the fluids except Hydrofluoric acid. Exposure to the mixture containing hydrofluoric acid resulted in an increase in specific gravity of greater than 20% for both the G-1 and the F-1 balls.

Figure 9:
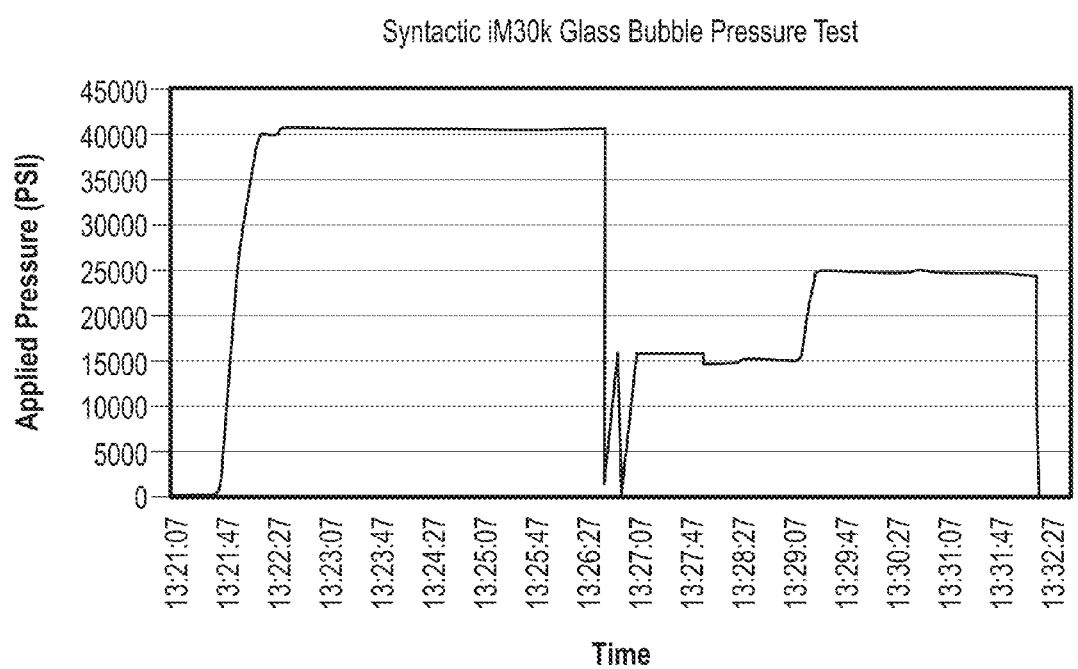
FIG. 9 is a graph showing the pressure applied to a sample syntactic foam over time according to an embodiment.

In Examples 2 and 4-5, exposure of sample syntactic foam balls to the testing fluid containing hydrofluoric acid caused significant increases in specific gravity relative to the other testing fluids. Although not wishing to be bound by theory, it is believed that a chemical sensitivity of the glass to hydrofluoric acid caused a degradation of the glass bubbles dispersed within the matrix during exposure to the testing fluid containing hydrofluoric acid. The effect of the hydrofluoric acid on the glass microspheres is illustrated by FIGS. 9A and 9B. FIG. 9A shows a micrograph of a matrix material compounded with glass bubbles. The glass bubbles are visible in the cross-sectional image of FIG. 9A as spheres. FIG. 9B shows a micrograph of a cross section of another sample of the matrix material compounded with glass beads

TABLE 6

Chemical Compatibility of Phenolic-Glass Syntactic Foam Balls

| Material Description | Test Fluid | Temp | Test Time (hr) | Mass in Air (g) | Mass in IPA (g) | SG | Percent Change SG |
|---|---|---|---|---|---|---|---|
| Phenolic-Glass Balls (G-1) (SG = 0.8) | 15% HCL | 275 F. | 0 | 0.555 | 0.099 | 0.957 | 1.84% |
| | | | 16 | 0.590 | 0.114 | 0.974 | |
| Phenolic-Glass Balls (G-1) (SG = 0.8) | 10% HCOOH + 10% $CH_3COOH$ | 275 F. | 0 | 0.578 | 0.102 | 0.954 | 3.93% |
| | | | 16 | 0.708 | 0.147 | 0.992 | |
| Phenolic-Glass Balls (G-1) (SG = 0.8) | 12% HCl + 3% HF | 275 F. | 0 | 0.556 | 0.097 | 0.952 | 21.62% |
| | | | 16 | 0.716 | 0.230 | 1.158 | |
| Phenolic-Glass Balls (G-1) (SG = 0.8) | Crude Oil | 275 F. | 0 | 0.555 | 0.097 | 0.952 | 0.54% |
| | | | 16 | 0.558 | 0.100 | 0.958 | |
| Phenolic-Glass Balls (F-1) (SG = 1.0) | 15% HCL | 275 F. | 0 | 0.485 | 0.027 | 0.832 | 3.98% |
| | | | 16 | 0.512 | 0.047 | 0.865 | |
| Phenolic-Glass Balls (F-1) (SG = 1.0) | 10% HCOOH + 10% $CH_3COOH$ | 275 F. | 0 | 0.493 | 0.028 | 0.833 | 3.60% |
| | | | 16 | 0.547 | 0.049 | 0.863 | |
| Phenolic-Glass Balls (F-1) (SG = 1.0) | 12% HCl + 3% HF | 275 F. | 0 | 0.489 | 0.025 | 0.828 | 33.74% |
| | | | 16 | 0.654 | 0.19 | 1.108 | |
| Phenolic-Glass Balls (F-1) (SG = 1.0) | Crude Oil | 275 F. | 0 | 0.487 | 0.023 | 0.825 | −0.83% |
| | | | 16 | 0.483 | 0.019 | 0.818 | | after exposure to hydrofluoric acid. From the cross-sectional image, it can be seen that the hydrofluoric acid dissolved the glass bubbles, leaving behind empty craters in the matrix material. Still not wishing to be bound by theory, it is believed that the open voids left behind after dissolution of the glass bubbles are filled by fluids, thereby increasing the overall density of the sample balls.

Example 6

The suitability of high-temperature amorphous engineered thermoplastic matrix materials were exposed to acidic testing fluids to determine the effect of the acids on the hardness and specific gravity of the test materials. The acidic testing fluids included: a 15 wt. % solution of hydrochloric acid, ("15% HCL"); a 50:50 mixture of 10 wt. % acetic acid solution and 10 wt % formic acid solution, ("10% HCOOH+10% CH$_3$COO"); and a solution containing 12 wt % hydrochloric acid and 3 wt % hydrofluoric acid, ("12% HCL+3% HF").

Example 7

Samples of high-temperature amorphous engineered thermoplastic material was exposed to the acidic testing fluids to evaluate the effects of the acids on the hardness and density properties of the matrix material. The results are shown in Table 7.

TABLE 7

Effects of Acid Exposure on Specific Gravity and Hardness of PPSU

| Sample No. | #1 | #2 | #3 | #4 | Hardness |
|---|---|---|---|---|---|
| Before exposure to acid | | | | | 82 |
| Mass in air, g | 0.719 | 0.602 | 0.712 | 0.586 | |
| Mass in IPA, g | 0.283 | 0.237 | 0.280 | 0.231 | |
| Specific gravity | 1.296 | 1.296 | 1.295 | 1.297 | |
| After exposure to acid for 24 hr | 15% HCL | 15% HCL | 10% HCOOH + 10% CH$_3$COOH | 10% HCOOH + 10% CH$_3$COOH | 82 |
| Mass in air, g | 0.721 | 0.605 | 0.719 | 0.592 | |
| Mass in IPA, g | 0.284 | 0.238 | 0.283 | 0.234 | |
| Specific gravity | 1.297 | 1.296 | 1.296 | 1.300 | |
| After exposure to acid for 10 days | 15% HCL | 15% HCL | 10% HCOOH + 10% CH$_3$COOH | 10% HCOOH + 10% CH$_3$COOH | 83 |
| Mass in air, g | 0.722 | 0.605 | 0.713 | 0.586 | |
| Mass in IPA, g | 0.285 | 0.238 | 0.280 | 0.230 | |
| Specific gravity | 1.299 | 1.296 | 1.294 | 1.294 | |

As indicated by Table 7, no change in plastic weight was observed after 10 days exposure to HCL solution though exposure to the mixture of 10% HCOOH+10% CH$_3$COOH caused slight decrease in mass and consequently specific gravity. Hardness values were unchanged after 24 hours of exposure to the acidic testing fluids. After 10 days, the hardness value had only changed by a value of 1. Also after 10 days, some discoloration was observed for the plastic immersed in the mixture of 10% HCOOH+10% CH$_3$COOH.

The syntactic foams disclosed herein exhibit compressive strengths sufficient to withstand the high pressures that may be encountered in the wellbore servicing environment in combination with densities less than or equal to the density of water. By incorporating syntactic foams into the flowable components described herein, said flowable components may possess an improved recoverability as a result of the greater buoyancy of the syntactic foam in comparison to other materials employed in downhole wellbore tools. In cases where the FCCSF becomes trapped or may have become trapped, such as a frac ball becoming stuck in the seat of the sliding sleeve of an activatable stimulation assembly, the greater buoyancy lowers the amount of energy required to break free.

In addition to improved recoverability, the of syntactic foam in flowable components may reduce the incidence of blockages caused by the flowable components and/or reduce the difficulty of removing the flowable component when it has become an obstruction. For example, by utilizing syntactic foams as materials for the drillable portions of the PFCCSF, the risk that the drilled pieces will obstruct fluid flowing through the drilled portion may be reduced and/or the probability of recovering the drilled portions may be increased. Although not wishing to be bound by theory, it is believed that the relatively low density syntactic foam of the drilled pieces have an increased escape force and/or ability to rise to the surface and be recovered compared to higher density materials.

The composite nature of syntactic foam is further advantageous for use in wellbore tools because the composite nature of syntactic foam allows a vast and diverse selection of materials to be utilized therein. As such, materials selected to form the syntactic foams may be tailored to a particular application and/or to have particular mechanical and/or chemical properties without sacrificing either the low density that contributes to the recoverability of the flowable components disclosed herein or the syntactic foam's ability to withstand the high pressures. Advantageously, the tailorability of the syntactic foam composition allows one or more reducible materials, such as the dissolvable, meltable, consumable, degradable, and disintegrable materials disclosed herein, to be incorporated into the syntactic foam. A FCCSF comprising one or more such reducible materials may advantageously allow a trapped FCCSF to undergo a size reduction sufficient to enable a trapped FCCSF to break free, thereby further increasing the recoverability of the flowable component from a wellbore and/or further reducing the difficulty of eliminating the FCCSF as an obstruction.

ADDITIONAL DISCLOSURE

The following are nonlimiting, specific embodiments in accordance with the present disclosure:

Embodiment 1, which is a method of servicing a wellbore comprising flowing a flowable component in a wellbore, wherein the flowable component comprises syntactic foam.

Embodiment 2, which is the method of any previous embodiment, wherein the syntactic foam comprises hollow particles dispersed within a matrix material.

Embodiment 3, which is the method of embodiment 2, wherein the matrix material comprises a polymeric material, a metallic material, a ceramic material, or combinations thereof.

Embodiment 4, which is the method of embodiment 3, wherein the polymer comprises a thermosetting resin, a thermoplastic resin, a solid polymer plastic, or combinations thereof.

Embodiment 5, which is the method of any one of embodiments 3-4, wherein the polymer comprises an epoxy resin, a bismaleimide, a cyanate, unsaturated polyesters, noncellular polyurethanes, thermosetting polyimides or combinations thereof.

Embodiment 6, which is the method of any one of embodiments 3-5, wherein the metallic material comprises aluminum, magnesium, nickel, aluminum alloy, magnesium alloy, titanium alloy, nickel alloy, steel, titanium aluminide, nickel aluminide, or combinations thereof.

Embodiment 7, which is the method of any one of embodiments 3-6, wherein the metallic material comprises aluminum, an aluminum alloy, or a combination thereof.

Embodiment 8, which is the method of any one of embodiments 2-7, wherein the matrix material comprises an oil-soluble component.

Embodiment 9, which is the method of embodiment 8, wherein the oil-soluble component comprises an oil-soluble polymer, an oil-soluble resin, an oil-soluble elastomer, a polyethylene, a carbonic acid, an amine, a wax, or combinations thereof.

Embodiment 10, which is the method of any one of embodiments 2-9, wherein the matrix material comprises a water-soluble component.

Embodiment 11, which is the method of embodiment 10, wherein the water-soluble component comprises a water-soluble polymer, a water-soluble elastomer, a carbonic acid, a salt, an amine, an inorganic salt, or combinations thereof.

Embodiment 12, which is the method of any one of embodiments 2-11, wherein the matrix material comprises a meltable material.

Embodiment 13, which is the method of embodiment 12, wherein the meltable material comprises a hydrocarbon having greater than or equal to about 30 carbon atoms, a polycaprolactone, a wax, a carboxylic acid, a carboxylic acid derivative, or combinations thereof.

Embodiment 14, which is the method of any one of embodiments 12-13, wherein the meltable material comprises a eutectic material.

Embodiment 15, which is the method of any previous embodiment, wherein the eutectic alloy comprises a salt-based eutectic material, a metal-based eutectic material, or a combination thereof.

Embodiment 16, which is the method of any one of embodiments 12-14, wherein the meltable material melts at downhole wellbore temperatures.

Embodiment 17, which is the method of any previous embodiment, wherein the flowable component comprises a thermally consumable material.

Embodiment 18, which is the method of embodiment 17, wherein the consumable material comprises magnesium.

Embodiment 19, which is the method of any previous embodiment, wherein the consumable material further comprises a fuel load and an igniter associated with the fuel load.

Embodiment 20, which is the method of embodiment 19, wherein the fuel load comprises thermite.

Embodiment 21, which is the method of any previous embodiment, further comprising igniting the fuel load using the igniter and consuming the magnesium.

Embodiment 22, which is the method of any one of embodiments 2-21, wherein the hollow particles comprise carbon microballoons, cenospheres, ceramic microspheres, glass microspheres, polymer microballoons, or combinations thereof.

Embodiment 23, which is the method of any one of embodiments 2-22, wherein the hollow particles encapsulate air, one or more inert gases, or combinations thereof.

Embodiment 24, which is the method of any previous embodiment, wherein the syntactic foam further comprises a fibrous material.

Embodiment 25, which is the method of embodiment 24, wherein the fibrous material comprises carbon, glass, Kevlar, aramid, carbon nanotubes, titanium dioxide nanotubes, or combinations thereof.

Embodiment 26, which is the method of any one of embodiments 24-25, wherein the fibrous material comprises continuous fibers, discontinuous fibers, or a combination thereof.

Embodiment 27, which is the method of any previous embodiment, wherein the flowable component further comprises a coating covering an outer surface of the syntactic foam.

Embodiment 28, which is the method of embodiment 27, wherein the coating comprises a polymer resin.

Embodiment 29, which is the method of any one of embodiments 27-28, wherein the coating comprises an epoxy resin.

Embodiment 30, which is the method of any previous embodiment, wherein the flowable component further comprises an outer shell covering an outer surface of the flowable component.

Embodiment 31, which is the method of any previous embodiment, wherein the outer shell comprises a composite, a rubber, or combinations thereof.

Embodiment 32, which is the method of embodiment 31, wherein the metal shell comprises aluminum, copper, beryllium, magnesium, iron, titanium, alloys thereof, oxides thereof, or combinations thereof.

Embodiment 33, which is the method of any one of embodiments 31-32, the metal shell comprises aluminum, titanium, alloys thereof, or combinations thereof.

Embodiment 34, which is the method of any previous embodiment, wherein an overall specific gravity of the flowable component is less than or equal to about 1.

Embodiment 35, which is the method of any previous embodiment, wherein the flowable component comprises a ballast.

Embodiment 36, which is the method of embodiment 35, wherein the ballast comprises a weight.

Embodiment 37, which is the method of any previous embodiment, wherein the weight comprises tungsten, steel, sand, a eutectic metal, or combinations thereof.

Embodiment 38, which is the method of any one of embodiments 35-37, wherein the ballast orients the flowable component in the wellbore.

Embodiment 39, which is the method of any previous embodiment, further comprising:

flowing the flowable component to a receiving member;

contacting the flowable component with the receiving member, forming a seal between the flowable component and the receiving member; and applying a pressure differential across the flowable component.

Embodiment 40, which is the method of any previous embodiment, further comprising rotating the flowable component into a pre-selected orientation.

Embodiment 41, which is the method of any previous embodiment, wherein the flowable component self-aligns according to a pre-selected three-dimensional orientation.

Embodiment 42, which is the method of any previous embodiment, further comprising maintaining the pre-selected orientation of the flowable component while the pressure differential is applied across the flowable component.

Embodiment 43, which is the method of any previous embodiment, wherein the flowable component is capable of withstanding greater pressure differentials in the pre-selected orientation than in other orientations.

Embodiment 44, which is the method of any previous embodiment, wherein the flowable component comprises a non-uniform strength profile.

Embodiment 45, which is the method of any previous embodiment, wherein an average diameter of the hollow particles is in a range of from about 1 μm to about 1000 μm.

Embodiment 46, which is the method of any previous embodiment, wherein an average diameter of the hollow particles is in a range of from about 5 μm to about 200 μm.

Embodiment 47, which is the method of any previous embodiment, wherein the hollow particles have an average crush strength in a range of from about 1,000 psi to about.

Embodiment 48, which is the method of any previous embodiment, wherein a specific gravity of the syntactic foam is less than or equal to about 1.

Embodiment 49, which is the method of any previous embodiment, wherein a specific gravity of the syntactic foam is in a range of from about 0.5 to about 1.

Embodiment 50, which is the method of any previous embodiment, wherein the hollow particles exhibit an average crush strength in a range of from about 1,000 psi to about 60,000 psi.

Embodiment 51, which is the method of any previous embodiment, wherein the hollow particles exhibit an average crush strength in a range of from about 4,000 psi to about 28,000 psi.

Embodiment 52, which is the method of any previous embodiment, further comprising applying a pressure differential across the seal, wherein the pressure differential is from about 4,000 psi to about 25,000 psi.

Embodiment 53, which is the method of any previous embodiment, wherein the flowable component has a hydrostatic crush strength of greater than or equal to about 19,000 psi.

Embodiment 54, which is the method of any previous embodiment, wherein the flowable component has a hydrostatic crush strength of greater than or equal to about 40,000 psi.

Embodiment 55, which is the method of any previous embodiment, further comprising recovering the flowable component from the wellbore.

Embodiment 56, which is the method of embodiment 55, wherein recovering the flowable component comprises reverse circulating fluid in the wellbore, allowing the flowable component to rise via buoyancy, carrying the flowable component with a formation fluid, or combinations thereof.

Embodiment 57, which is the method of any previous embodiment, further comprising recovering the flowable component by flowing the flowable component to the surface.

Embodiment 58, which is the method of any previous embodiment, wherein the flowable component self-flows to the surface and is recovered.

Embodiment 59, which is a wellbore servicing apparatus comprising a flowable component, wherein the flowable component comprises syntactic foam and is configured to interact with a downhole component.

Embodiment 60, which is the apparatus of embodiment 59, wherein the flowable component is configured to maintain neutral or positive buoyancy when submerged in a wellbore servicing fluid under downhole conditions.

Embodiment 61, which is the apparatus of any one of embodiments 59-60, wherein the flowable component comprises a surface profile and a density configured to maintain neutral or positive buoyancy when submerged in a wellbore servicing fluid under downhole fluid dynamic conditions.

Embodiment 62, which is the apparatus of any one of embodiments 59-61, wherein the flowable component comprises an obturating member, the downhole component comprises a receiving member, and the obturating member is configured to sealingly engage a receiving member.

Embodiment 63, which is the apparatus of embodiment 62, wherein the obturating member comprises a ball, a dart, or a plug.

Embodiment 64, which is the apparatus of any one of embodiments 59-63, wherein the flowable component comprises a cementing plug, and a drillable core of the cementing plug comprises the syntactic foam.

Embodiment 65, which is the apparatus of any one of embodiments 59-64, wherein the flowable component comprises one or more electronic components.

Embodiment 66, which is the apparatus of any one of embodiments 59-65, wherein the flowable component comprises one or more magnets.

Embodiment 67, which is the apparatus of any one of embodiments 59-66, wherein the syntactic foam comprises magnetically impermeable material.

Embodiment 68, which is the apparatus of any one of embodiments 59-67, wherein the flowable component further comprises a magnetic transceiver configured to send and/or receive magnetic signals.

Embodiment 69, which is the apparatus of any one of embodiments 59-68, wherein the flowable component comprises a signaling device.

Embodiment 70, which is the apparatus of embodiment 69, wherein the signaling device comprises a transceiver configured to send and/or receive a wireless signal.

Embodiment 71, which is the apparatus of embodiment 70, wherein the wireless signal comprises a radio frequency, an RFID signal, an NFC signal, a magnetic field, an acoustic signal, or combinations thereof.

Embodiment 72, which is the apparatus of any one of embodiments 69-70, wherein the wireless signal is unique to the transceiver.

Embodiment 73, which is a wellbore servicing system, comprising:
a wellbore;
a tubular string disposed within the wellbore; and
a flowable component comprising syntactic foam and configured to interact with a downhole component integrated with the tubular string.

Embodiment 74, which is the system of embodiment 73, further comprising a housing defining an axial flowbore disposed in the wellbore and comprising one or more ports providing a route of fluid communication between the axial flowbore and an exterior of the housing, and wherein downhole component comprises a sliding sleeve disposed within the housing and is actuatable from a first position in which the ports are obstructed by the sliding sleeve to a second position in which the ports are unobstructed by the sliding sleeve.

Embodiment 75, which is the system of embodiment 74, wherein the sliding sleeve further comprises an orifice and a seat disposed around the orifice, and wherein the flowable component comprises an obturating member configured to sealingly engage the seat.

Embodiment 76, which is the system of any one of embodiments 74-75, wherein the system is configured such that an application of a pressure differential to the obturating member while the obturating member sealingly engages the seat applies a force to the sliding sleeve in the direction of the second position.

Embodiment 77, which is the system of any one of embodiments 74-76, wherein the sliding sleeve is coupled to an actuator configured to actuate the sliding sleeve between the first position and the second position, and wherein the actuator is coupled to a control device comprising a receiver and configured to initiate actuation of the actuator according to instructions received by the receiver via wireless signal.

Embodiment 78, which is the system of any one of embodiments 73-77, wherein the flowable component comprises a signaling device configured to send a wireless signal to the receiver, and where the wireless signal comprises instructions for actuating the sliding sleeve.

Embodiment 79, which is the system of any one of embodiments 73-78, wherein the downhole component comprises a seat, and wherein the flowable component is configured to sealingly engage the seat.

Embodiment 80, which is the system of any one of embodiments 73-79, wherein the flowable component comprises a ball or a dart.

Embodiment 81, which is the system of any one of embodiments 73-80, further comprising a float shoe and a float collar disposed upstream of the float shoe, wherein the downhole component comprises a cementing plug disposed upstream of the float collar and having a drillable core comprising syntactic foam.

Embodiment 82, which is a method of servicing a wellbore, comprising:
forming a flowable component comprising syntactic foam;
providing the flowable component to a wellsite operator, wherein the wellsite operator introduces the flowable component into the wellbore;
flowing the flowable component in the wellbore.

Embodiment 83, which is the method of embodiment 82, further comprising recovering the flowable component by flowing the flowable component to the surface.

Embodiment 84, which is the method of any one of embodiments 82-83, wherein forming the flowable component comprises machining a continuous piece of syntactic foam into an intended shape of the flowable component.

Embodiment 85, which is the method of any one of embodiments 82-84, wherein forming the flowable component further comprises machining one or more voids configured to receive one or more subcomponents and placing the one or more subcomponents in the one or more voids.

Embodiment 86, which is the method of any one of embodiments 82-85, wherein forming the flowable component further comprises encapsulating the one or more subcomponents within the flowable component by covering exposed portions of the one or more subcomponents with additional syntactic foam.

Embodiment 87, which is the method of any one of embodiments 82-86, wherein forming the flowable component comprises:
providing a mold having a profile characteristic of a flowable component in a wellbore;
injecting a syntactic foam into the mold;
recovering the flowable component comprising the syntactic foam from the mold.

Embodiment 88, which is the method of embodiment 87, wherein a profile of the mold is characteristic of a flowable component in a wellbore.

Embodiment 89, which is the method of any one of embodiments 87-88, wherein the mold comprises a mount adapted to maintain a position of a subcomponent of the flowable component during injection of the syntactic foam into the mold.

Embodiment 90, which is the method of any one of embodiments 87-89, wherein injecting the syntactic foam into the mold comprises injecting the syntactic foam around the subcomponent and at least partially enclose the subcomponent within a body of injection-molded syntactic foam.

Embodiment 91, which is a method of servicing a wellbore comprising:
providing a flowable component comprising syntactic foam; and
communicating the flowable component into a wellbore.

Embodiment 92, which is the method of embodiment 91, wherein the syntactic foam comprises hollow particles dispersed within a matrix material.

Embodiment 93, which is the method of embodiment 92, wherein the matrix material comprises a ceramic material.

Embodiment 94, which is the method of any one of embodiments 92-93, wherein the matrix material comprises a polymeric material, wherein the polymeric material comprises a thermosetting resin, a thermoplastic resin, a solid polymer plastic, or combinations thereof.

Embodiment 95, which is the method of any one of embodiments 92-94, wherein the matrix material comprises a polymeric material, wherein the polymeric material comprises an epoxy resin, a bismaleimide, a cyanate, an unsaturated polyester, a noncellular polyurethane, a thermosetting polyimides, or combinations thereof.

Embodiment 96, which is the method of any one of embodiments 92-95, wherein the matrix material comprises a metallic material, wherein the metallic material comprises aluminum, magnesium, nickel, aluminum alloy, magnesium alloy, titanium alloy, nickel alloy, steel, titanium aluminide, nickel aluminide, or combinations thereof.

Embodiment 97, which is the method of any one of embodiments 92-96, wherein the hollow particles comprise carbon microballoons, cenospheres, ceramic microspheres, glass microspheres, polymer microballoons, or combinations thereof.

Embodiment 98, which is the method of any one of embodiments 92-97, wherein the hollow particles comprise an interior volume, wherein the interior volume comprises air, an inert gas, or combinations thereof.

Embodiment 99, which is the method of any one of embodiments 92-98, wherein the syntactic foam further comprises a fibrous material.

Embodiment 100, which is the method of embodiment 99, wherein the fibrous material comprises carbon, glass, Kevlar, aramid, carbon nanotubes, titanium dioxide nanotubes, or combinations thereof.

Embodiment 101, which is the method of any one of embodiments 92-100, wherein the flowable component further comprises a coating covering an outer surface thereof.

Embodiment 102, which is the method of embodiment 101, wherein the coating comprises a polymer resin, an epoxy resin, a composite material, a rubber, or combinations thereof.

Embodiment 103, which is the method of any one of embodiments 91-102, wherein the flowable component further comprises an outer shell covering an outer surface of the flowable component.

Embodiment 104, which is the method of any one of embodiments 91-103, wherein the flowable component further comprises a shell covering an outer surface thereof.

Embodiment 105, which is the method of embodiment 104, wherein the shell comprises aluminum, copper, beryllium, magnesium, iron, titanium, alloys thereof, oxides thereof, or combinations thereof.

Embodiment 106, which is the method of any one of embodiments 91-105, wherein upon communicating the flowable component into the wellbore, the flowable component arrives at a pre-selected orientation.

Embodiment 107, which is the method of embodiment 106, wherein the flowable component comprises a ballast.

Embodiment 108, which is the method of any one of embodiments 91-107, further comprising:
contacting the flowable component with a seat; and
applying a fluid pressure to the seat via the flowable component.

Embodiment 109, which is the method of any one of embodiments 91-108, further comprise communicating a signal from the flowable component to a wellbore servicing tool disposed within the wellbore.

Embodiment 110, which is the method of embodiment 109, wherein the signal comprises a near-field communication (NFC) protocol signal, a radio-frequency identification signal (RFID), a magnetic signal, an acoustic signal, or combinations thereof.

Embodiment 111, which is a method of servicing a wellbore comprising:
providing a flowable component comprising syntactic foam;
communicating the flowable component into a wellbore; and
allowing the flowable component to be removed from the wellbore.

Embodiment 112, which is the method of embodiment 111, wherein the flowable component is communicated into the wellbore with a wellbore fluid, wherein the flowable component comprises a relative density with respect to the wellbore fluid of less than 1.

Embodiment 113, which is the method of embodiment 112, wherein allowing the flowable component to be removed from the wellbore comprises allowing the flowable component to rise within the wellbore fluid.

Embodiment 114, which is the method of embodiment 113, further comprising reverse-circulating the wellbore fluid while the flowable component rises with the wellbore fluid.

Embodiment 115, which is the method of any one of embodiments 113-114, wherein the flowable component rises within the wellbore fluid at a first rate and the wellbore fluid is reverse-circulated at a second rate, wherein the first rate is not less than the second rate.

Embodiment 116, which is the method of any one of embodiments 113-115, further comprising recovering the flowable component from the wellbore.

Embodiment 117, which is the method of any one of embodiments 111-116, wherein the syntactic foam comprises hollow particles dispersed within a matrix material.

Embodiment 118, which is the method of embodiment 117, wherein the matrix material comprises a degradable material, a dissolvable material, a meltable material, or combinations thereof.

Embodiment 119, which is the method of any one of embodiments 117-118, wherein the matrix material comprises an oil-soluble material.

Embodiment 120, which is the method of embodiment 119, wherein the oil-soluble material comprises an oil-soluble polymer, an oil-soluble resin, an oil-soluble elastomer, a polyethylene, a carbonic acid, an amine, a wax, or combinations thereof.

Embodiment 121, which is the method of any one of embodiments 117-120, wherein the matrix material comprises a water-soluble material.

Embodiment 122, which is the method of embodiment 120, wherein the water-soluble material comprises a water-soluble polymer, a water-soluble elastomer, a carbonic acid, a salt, an amine, an inorganic salt, or combinations thereof.

Embodiment 123, which is the method of any one of embodiments 117-122, wherein the matrix material comprises a meltable material.

Embodiment 124, which is the method of embodiment 123, wherein the meltable material comprises a hydrocarbon having greater than or equal to about 30 carbon atoms, a polycaprolactone, a wax, a carboxylic acid, a carboxylic acid derivative, or combinations thereof.

Embodiment 125, which is the method of any one of embodiments 123-124, wherein the meltable material comprises a eutectic material.

Embodiment 126, which is the method of any one of embodiments 123-125, wherein the meltable material melts at downhole wellbore temperatures.

Embodiment 127, which is the method of any one of embodiments 111-126, wherein the flowable component comprises a thermally consumable material.

Embodiment 128, which is the method of any one of embodiments 111-127, further comprising:
contacting the flowable component with a seat; and
applying a fluid pressure to the seat via the flowable component.

Embodiment 129, which is the method of any one of embodiments 111-128, further comprise communicating a signal from the flowable component to a wellbore servicing tool disposed within the wellbore.

Embodiment 130, which is the method of embodiment 129, wherein the signal comprises a near-field communication (NFC) protocol signal, a radio-frequency identification signal (RFID), a magnetic signal, an acoustic signal, or combinations thereof.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$ and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application.

What is claimed is:

1. A method of servicing a wellbore comprising:
   providing a flowable component comprising syntactic foam, wherein the syntactic foam comprises hollow particles dispersed within a matrix material and wherein the matrix material comprises an oil-soluble material, wherein the flowable component is self-orienting and comprises a center of mass that is offset from a geometric center of the flowable component;
   communicating the flowable component into a wellbore;
   contacting the flowable component with a seat on a downhole tool disposed in the wellbore;
   applying a fluid pressure to the seat via the flowable component to mechanically actuate the downhole tool; and
   allowing the flowable component to be removed from the wellbore.

2. The method of claim 1, wherein the flowable component is communicated into the wellbore with a wellbore fluid, wherein the flowable component comprises a relative density with respect to the wellbore fluid of less than 1.

3. The method of claim 2, wherein allowing the flowable component to be removed from the wellbore comprises allowing the flowable component to rise within the wellbore fluid.

4. The method of claim 3, further comprising reverse-circulating the wellbore fluid while the flowable component rises with the wellbore fluid.

5. The method of claim 4, wherein the flowable component rises within the wellbore fluid at a first rate and the wellbore fluid is reverse-circulated at a second rate, wherein the first rate is not less than the second rate.

6. The method of claim 3, further comprising recovering the flowable component from the wellbore.

7. The method of claim 1, wherein the oil-soluble material comprises an oil-soluble polymer, an oil-soluble resin, an oil-soluble elastomer, a polyethylene, a carbonic acid, an amine, a wax, or combinations thereof.

8. The method of claim 1, further comprise communicating a signal from the flowable component to a wellbore servicing tool disposed within the wellbore.

9. The method of claim 8, wherein the signal comprises a near-field communication (NFC) protocol signal, a radio-frequency identification signal (RFID), a magnetic signal, an acoustic signal, or combinations thereof.

10. The method of claim 1, wherein applying the fluid pressure comprises applying a pressure differential of from 4,000 psi to 25,000 psi to the flowable component.

11. A method of servicing a wellbore comprising:
    providing a flowable component comprising syntactic foam, wherein the syntactic foam comprises hollow particles dispersed within a matrix material, wherein the matrix material comprises a water-soluble material, and wherein the water-soluble material comprises a hydrolytically degradable polymer, wherein the flowable component is self-orienting and comprises a center of mass that is offset from a geometric center of the flowable component;
    communicating the flowable component into a wellbore;
    contacting the flowable component with a seat on a downhole tool disposed in the wellbore;
    applying a fluid pressure to the seat via the flowable component to mechanically actuate the downhole tool; and
    allowing the flowable component to be removed from the wellbore.

12. The method of claim 11, wherein the flowable component is communicated into the wellbore with a wellbore fluid, wherein the flowable component comprises a relative density with respect to the wellbore fluid of less than 1.

13. The method of claim 12, wherein allowing the flowable component to be removed from the wellbore comprises allowing the flowable component to rise within the wellbore fluid.

14. The method of claim 12, further comprising reverse-circulating the wellbore fluid while the flowable component rises with the wellbore fluid.

15. The method of claim 11, further comprise communicating a signal from the flowable component to a wellbore servicing tool disposed within the wellbore.

16. The method of claim 11, wherein the water-soluble material comprises an aliphatic polyester.

17. The method of claim 11, wherein applying the fluid pressure comprises applying a pressure differential of from 4,000 psi to 25,000 psi to the flowable component.

18. A method of servicing a wellbore comprising:
    providing a self-orienting flowable component comprising syntactic foam, wherein the self-orienting flowable component comprises a center of mass that is offset from a geometric center of the self-orienting flowable component;
    communicating the flowable component into a wellbore;
    contacting the flowable component with a seat on a downhole tool disposed in the wellbore;
    applying a fluid pressure to the seat via the flowable component to mechanically actuate the downhole tool; and
    allowing the flowable component to be removed from the wellbore.

* * * * *